United States Patent [19]
Nakajima et al.

[11] Patent Number: 6,094,499
[45] Date of Patent: Jul. 25, 2000

[54] PATTERN COLLATION APPARATUS

[75] Inventors: Hiroshi Nakajima; Koji Kobayashi, both of Tokyo, Japan

[73] Assignee: Yamatake-Honeywell Co., Ltd., Japan

[21] Appl. No.: 08/918,179

[22] Filed: Aug. 25, 1997

[30] Foreign Application Priority Data

Aug. 26, 1996 [JP] Japan .................................. 8-223607

[51] Int. Cl.$^7$ .................................................. G06K 9/00
[52] U.S. Cl. .......................... 382/124; 382/115; 382/125; 382/127; 382/210; 382/278; 382/280; 382/296; 382/298; 359/561; 356/71; 364/728.03; 364/822; 364/827
[58] Field of Search .................................. 382/115, 125, 382/127, 210, 278, 280, 296, 298; 356/71; 396/15; 364/728.03, 822, 827; 359/561

[56] References Cited

U.S. PATENT DOCUMENTS

| | | | |
|---|---|---|---|
| 5,050,220 | 9/1991 | Marsh et al. | 382/124 |
| 5,619,596 | 4/1997 | Iwaki et al. | 382/210 |
| 5,910,999 | 6/1999 | Mukohzaka | 382/124 |
| 5,915,034 | 6/1999 | Nakajima et al. | 382/124 |

FOREIGN PATENT DOCUMENTS

| | | |
|---|---|---|
| 7-108526 | 4/1995 | Japan . |
| 7-254062 | 10/1995 | Japan . |

OTHER PUBLICATIONS

"Introduction to Computer Image Processing" Japan Industrial Technology Center pp. 44–45, Jun., 1990.

"Fingerprint Identification Algorithm Using 2–D DFT" Savemation Review pp. 2–7, Feb., 1995.

"Fingerprint Identification System using Liquid Crystal Spatial Light Modulators for Phase Modulation", The Institute of Electronics, Information and Communication Engineers, Proceedings of the 1993 IEICE Fall Conference D–287, Sep. 1993.

*Primary Examiner*—Christopher S. Kelley
*Attorney, Agent, or Firm*—Blakely Sokoloff Taylor & Zafman

[57] ABSTRACT

A pattern collation apparatus is designed to identify a registration pattern and a collation pattern as identical patterns or not even with a rotation offset between the registration pattern and the collation pattern. The image data of a registration fingerprint is rotated through m·a degrees, and two-dimensional discrete Fourier transform is performed for the resultant image data to obtain registration Fourier image data. The registration Fourier image data with m=−90 to +90 are filed as registration Fourier image data. In collation processing, registration Fourier image data are read out from the registration Fourier image data in units of patterns, and each registration Fourier image data is synthesized with the collation Fourier image data, thereby performing collation between the registration fingerprint and the collation fingerprint.

14 Claims, 26 Drawing Sheets

FIG. 1
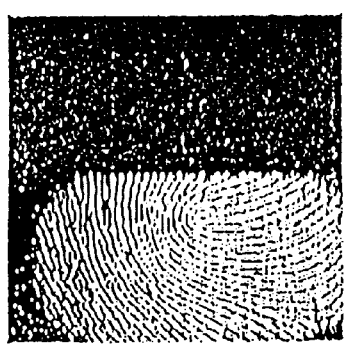
(a)
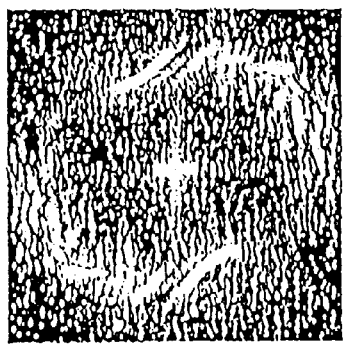
(b)
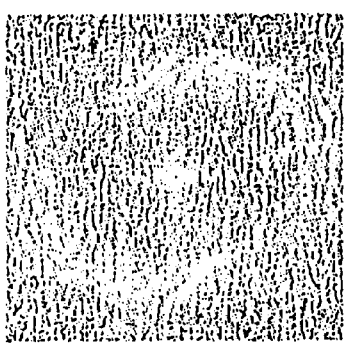
(c)
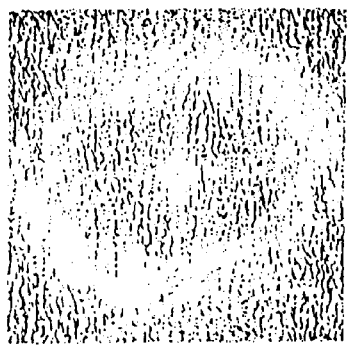
(d)
(e)
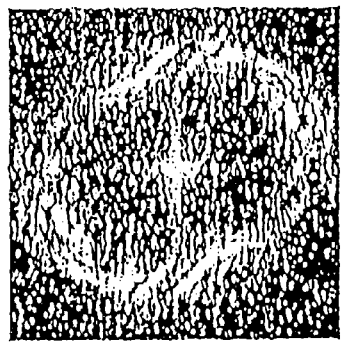
(f)
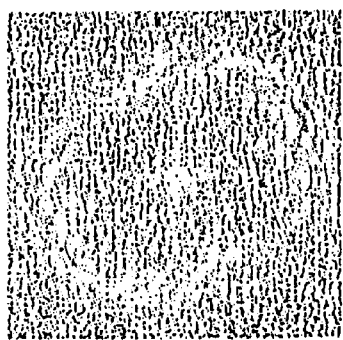
(g)
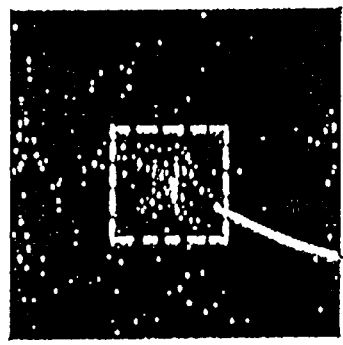
(h)

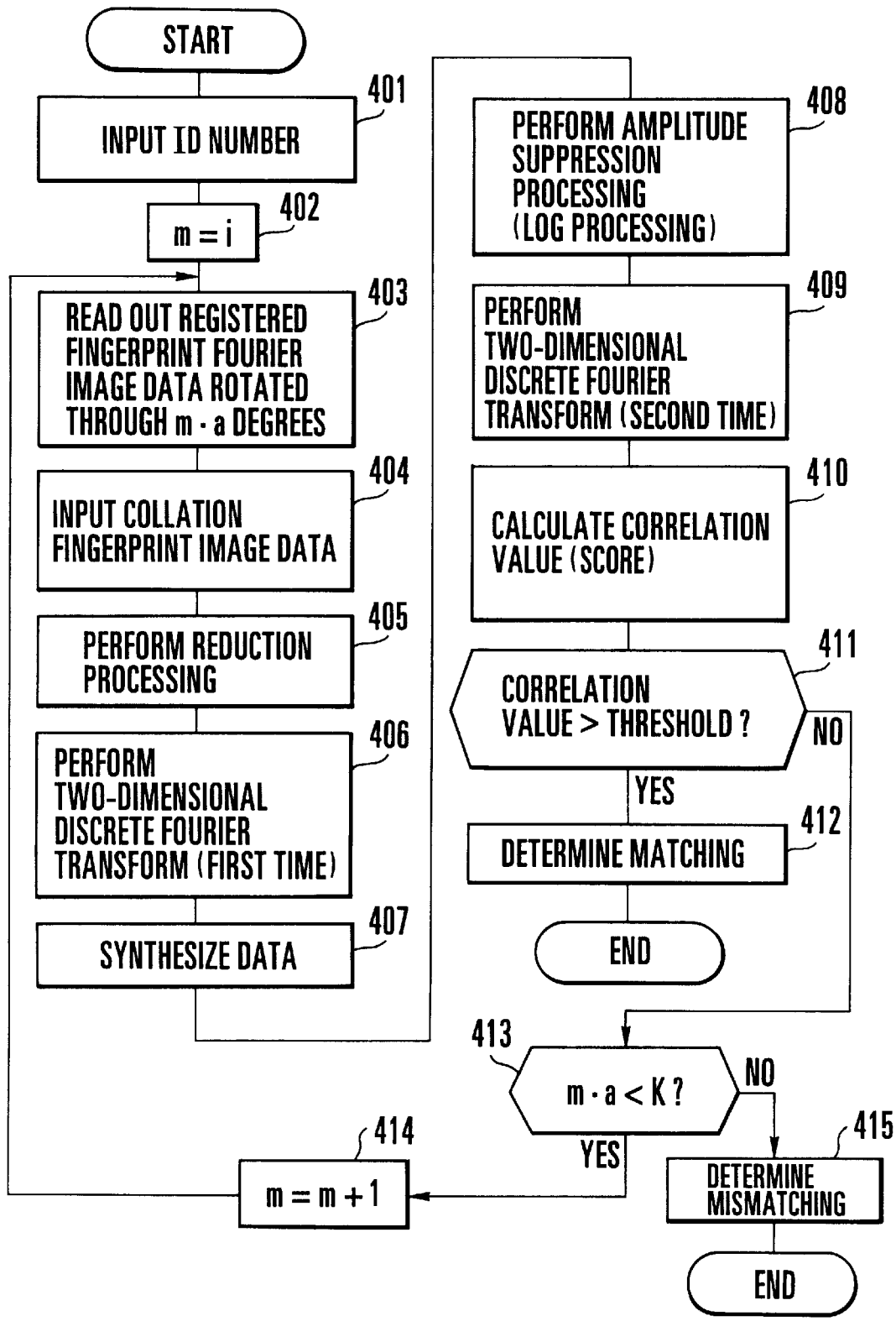
F I G. 4

FIG. 6

| | | | | | | | | | | | | | |
|---|---|---|---|---|---|---|---|---|---|---|---|---|---|
| 85 | 95 | 20 | 59 | 45 | 56 | 33 | 14 | 4 | 42 | 25 | 22 | 35 | 19 | 9 |
| 153 | 26 | 71 | 142 | 23 | 21 | 59 | 82 | 13 | 110 | 12 | 27 | 39 | 50 | 26 |
| 32 | 117 | 153 | 18 | 28 | 27 | 0 | 96 | 38 | 66 | 2 | 28 | 57 | 62 | 24 |
| 85 | 135 | 14 | 42 | 54 | 7 | 37 | 46 | 5 | 50 | 96 | 28 | 44 | 7 | 38 |
| 133 | 5 | 13 | 69 | 37 | 21 | 42 | 75 | 86 | 45 | 42 | 5 | 18 | 90 | 47 |
| 100 | 9 | 56 | 20 | 1 | 61 | 4 | 44 | 110 | 48 | 27 | 38 | 42 | 18 | 119 |
| 122 | 117 | 89 | 50 | 32 | 126 | 30 | 31 | 38 | 31 | 62 | 54 | 45 | 8 | 9 |
| 133 | 90 | 27 | 24 | 46 | 142 | 12 | 9 | 99 | 28 | 70 | 34 | 31 | 51 | 16 |
| 50 | 91 | 184 | 97 | 54 | 10 | 4 | 44 | 43 | 88 | 100 | 33 | 17 | 72 | 72 |
| 198 | 150 | 2 | 18 | 24 | 2 | 253 | 107 | 153 | 11 | 59 | 66 | 27 | 137 | 50 |
| 434 | 183 | 25 | 206 | 202 | 12 | 386 | 79 | 18 | 296 | 204 | 44 | 21 | 158 | 96 |
| 198 | 106 | 85 | 489 | 154 | 327 | 632 | 206 | 241 | 245 | 153 | 66 | 46 | 38 | 9 |
| 50 | 43 | 108 | 322 | 297 | 111 | 950 | 123 | 276 | 64 | 21 | 39 | 88 | 33 | 2 |
| 133 | 66 | 132 | 274 | 9 | 17 | 159 | 272 | 182 | 54 | 52 | 67 | 44 | 146 | 7 |
| 122 | 142 | 31 | 80 | 102 | 120 | 189 | 36 | 64 | 35 | 44 | 81 | 49 | 9 | 38 |
| 100 | 0 | 21 | 31 | 162 | 215 | 12 | 0 | 31 | 78 | 19 | 114 | 38 | 79 | 1 |
| 133 | 258 | 50 | 111 | 32 | 65 | 16 | 51 | 3 | 22 | 23 | 34 | 16 | 89 | 6 |
| 86 | 82 | 60 | 120 | 12 | 27 | 37 | 17 | 67 | 5 | 22 | 69 | 47 | 24 | 37 |
| 32 | 82 | 31 | 82 | 129 | 38 | 22 | 48 | 50 | 27 | 42 | 22 | 20 | 7 | 18 |
| 153 | 80 | 10 | 3 | 75 | 92 | 10 | 96 | 35 | 28 | 15 | 72 | 42 | 19 | 74 |
| 5 | 79 | 41 | 38 | 44 | 36 | 6 | 37 | 23 | 33 | 47 | 85 | 67 | 63 | 10 |
| 38 | 17 | 3 | 7 | 5 | 6 | 30 | 14 | 41 | 30 | 33 | 32 | 47 | 52 | 31 |
| 77 | 32 | 28 | 34 | 34 | 34 | 87 | 0 | 17 | 65 | 52 | 35 | 26 | 84 | 45 |
| 23 | 49 | 26 | 20 | 0 | 14 | 11 | 96 | 11 | 21 | 45 | 135 | 55 | 2 | 77 |

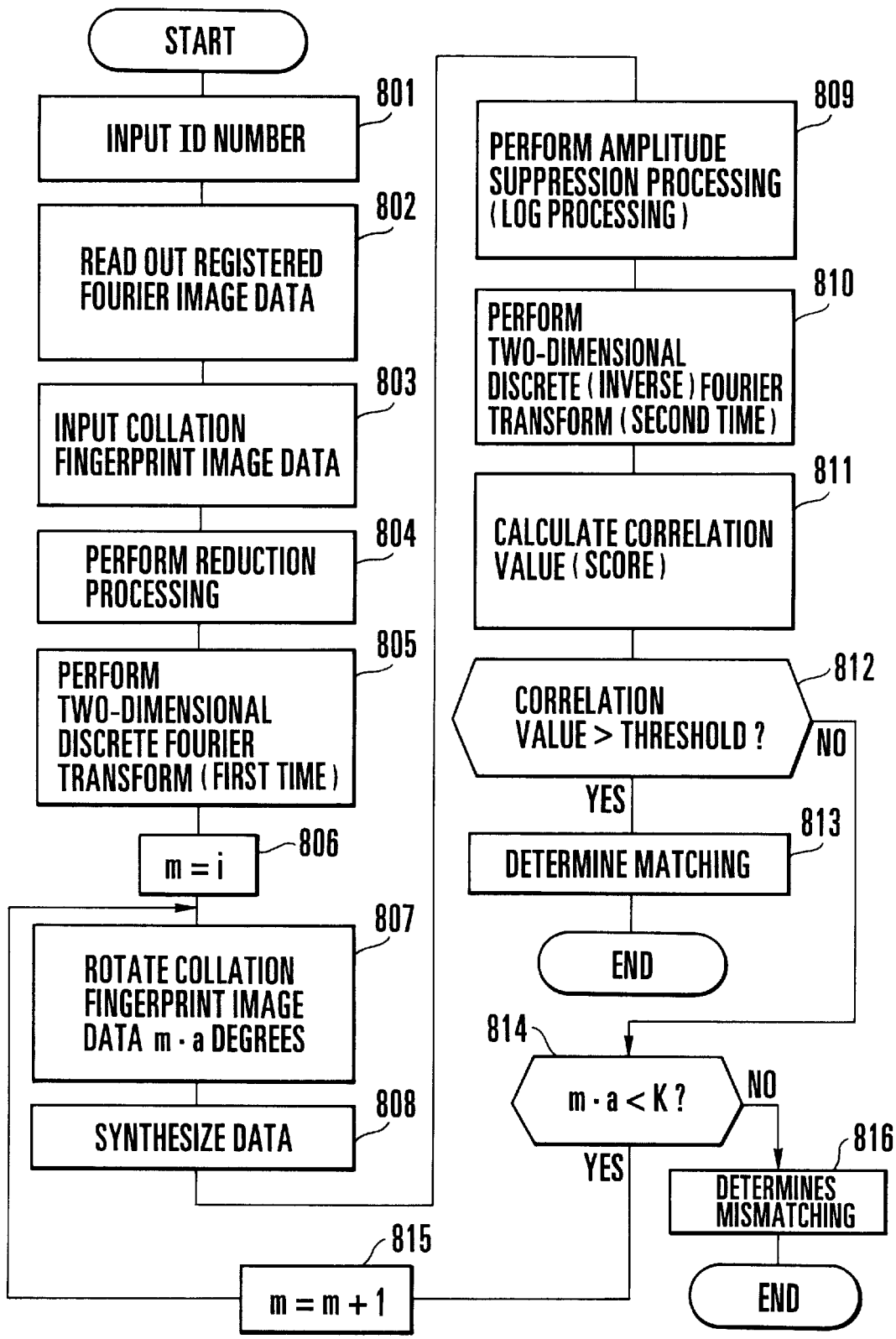
F I G. 14

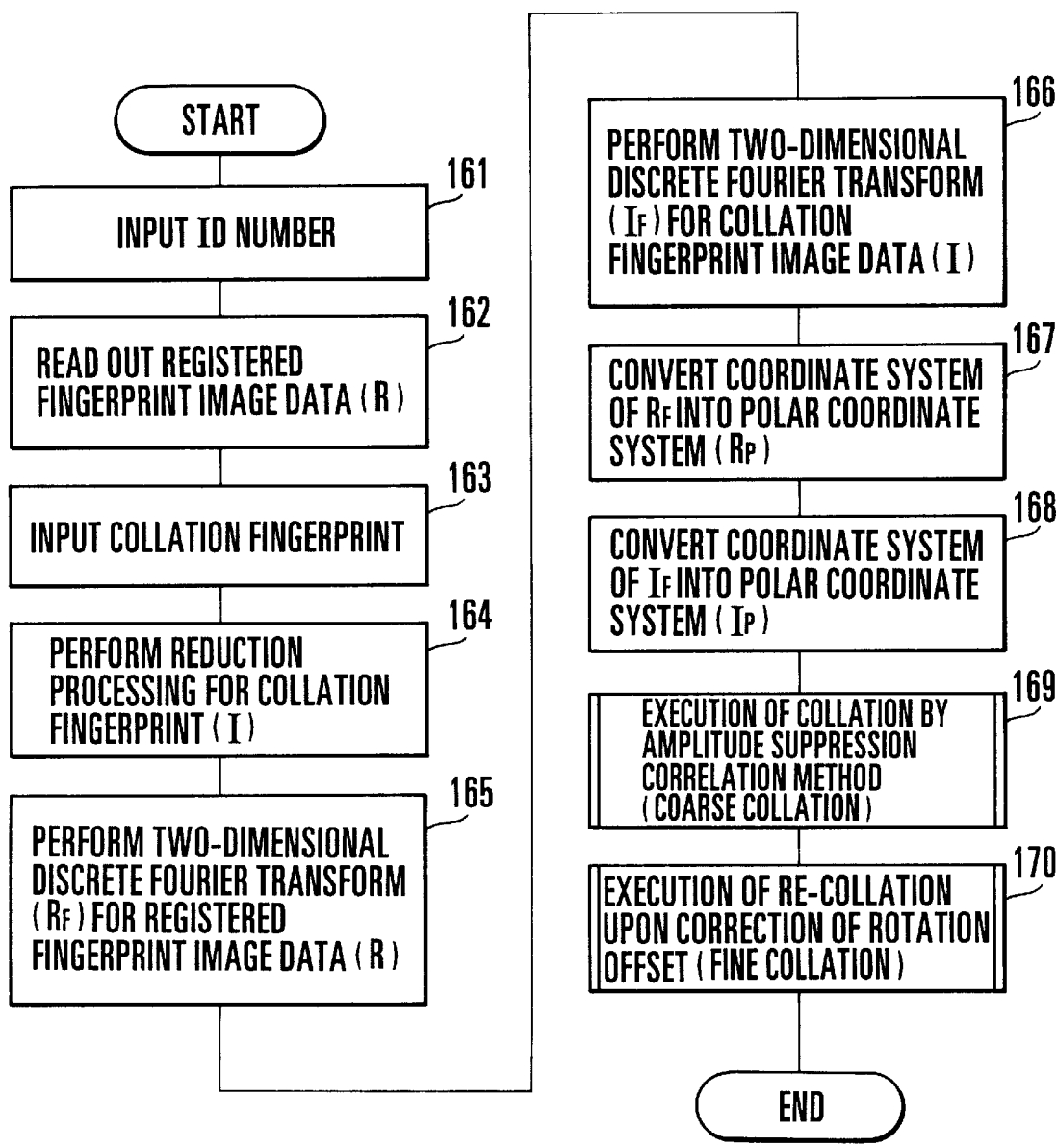
F I G. 16

(a) R
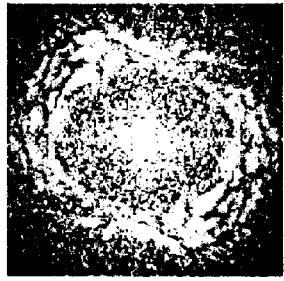
(c) $R_F$
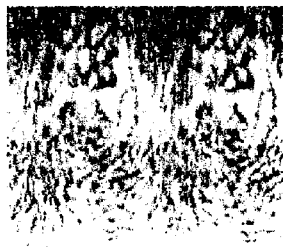
(e) $R_P$
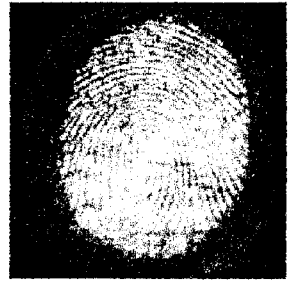
(b) I
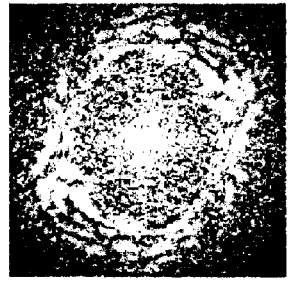
(d) $I_F$
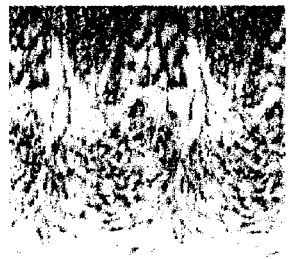
(f) $I_P$
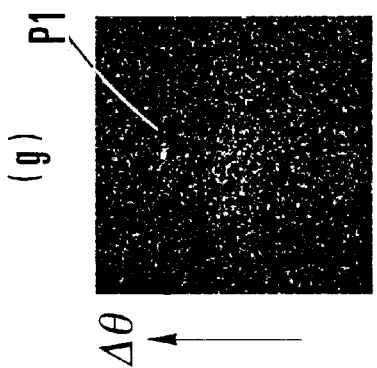
(g) P1, $\Delta\theta$
COARSE COLLATION
FIG. 17

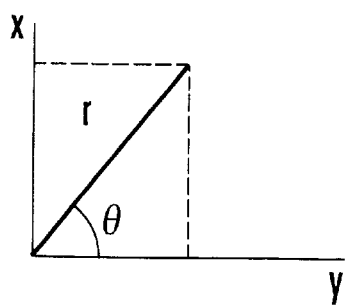 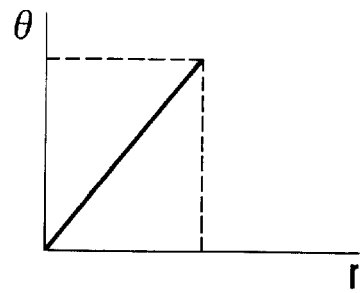
F I G. 18 A          F I G. 18 B

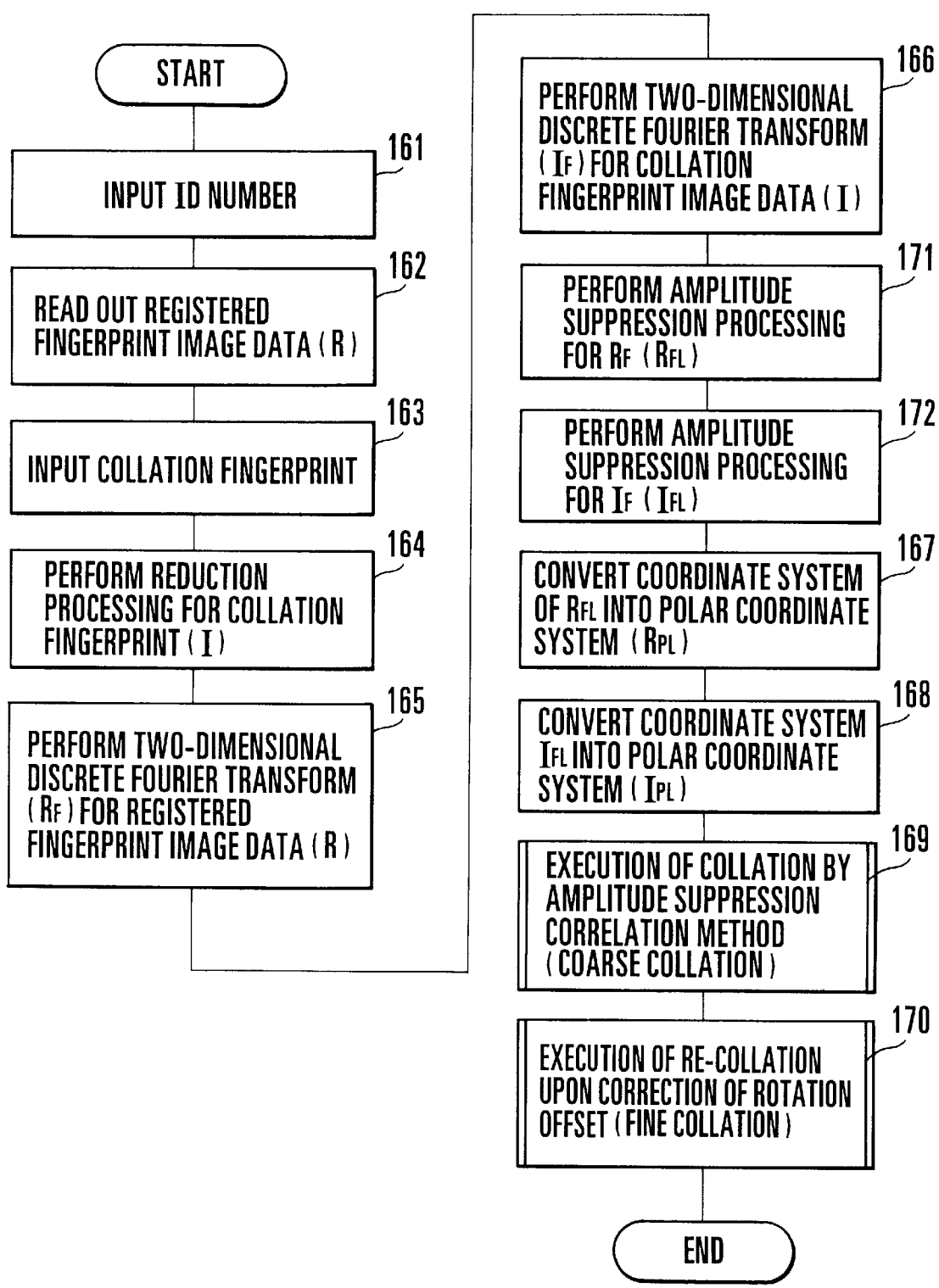
F I G. 23

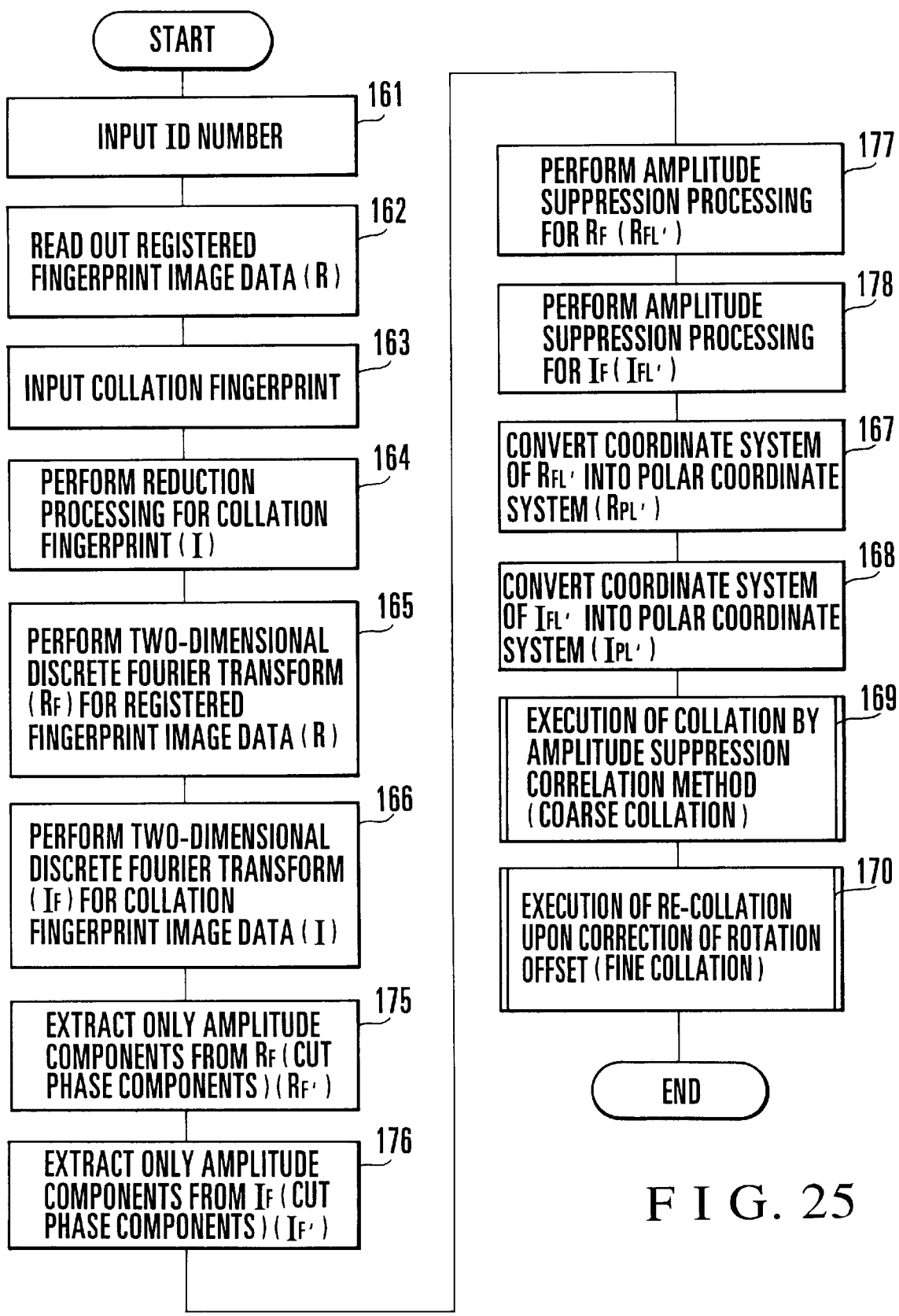
F I G. 25

FIG. 26
COARSE COLLATION
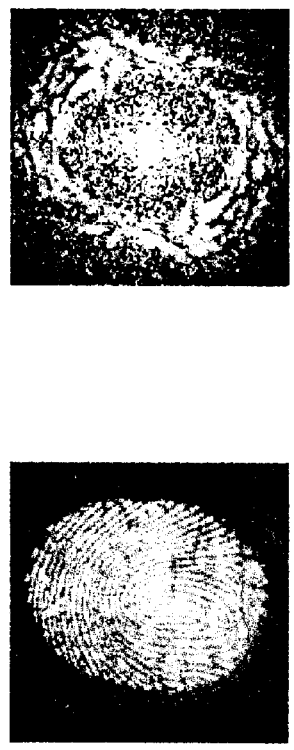
(a) R
(b) I
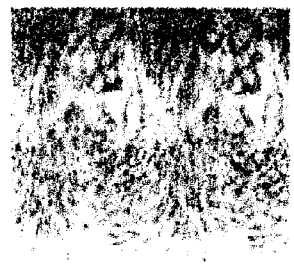
(c) R_F
(d) I_F
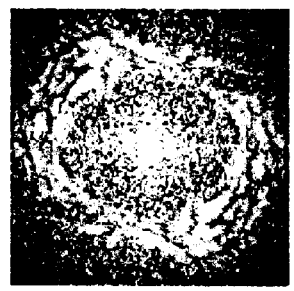
(e) R_P
(f) I_P
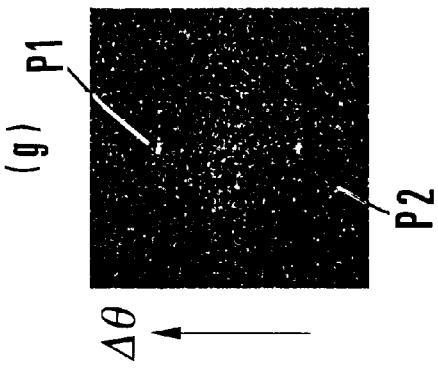
(g)

PATTERN COLLATION APPARATUS

BACKGROUND OF THE INVENTION

The present invention relates to a pattern collation apparatus for performing collation of N-dimensional patterns (e.g., fingerprints (two-dimensional) and stereoscopic (three-dimensional) patterns) on the basis of spatial frequency characteristics.

Fingerprint collation apparatuses have begun to replace apparatuses using personal identification numbers and ID cards in the fields demanding personal recognition such as the fields of the management of access to computer rooms and important mechanical rooms and the management of access to computer terminals and financial terminals in banks.

The present inventor proposed a pattern collation apparatus in Japanese Patent Application No. 7-108526. In this pattern collation apparatus, two-dimensional discrete Fourier transform is performed for the image data of registration patterns to generate registration Fourier image data, and two-dimensional discrete Fourier transform is performed for the image data of a collation pattern (subjected to collation) to generate collation Fourier image data. The registration Fourier image data and the collation fourier image data are synthesized. Two-dimensional discrete Fourier transform is then performed for the resultant synthesized Fourier image data, and n pixels having higher spectrum intensities are extracted from a correlation component area appearing in the synthesized Fourier transformed image data. The average of the spectrum intensities of the n extracted pixels is set as a correlation value. This correlation value is compared with a threshold. With this process, collation between the registration patterns and the collation pattern is performed.

In this pattern collation apparatus, however, if a rotation offset of six degrees or more occurs between a given registration pattern and a collation pattern, the registration pattern and the collation pattern cannot be identified as identical patterns or different patterns.

SUMMARY OF THE INVENTION

The present invention has been made to solve this problem, and has as its object to provide a pattern collation apparatus which can identify a registration pattern and a collation pattern as identical patterns or different patterns even if a rotation offset occurs between the registration pattern and the collation pattern.

In order to achieve the above object, according to the first aspect of the present invention (according to claim 1), registration Fourier N-dimensional pattern data are generated by performing N-dimensional discrete Fourier transform for N-dimensional pattern data of a registration pattern and a plurality of N-dimensional pattern data obtained by rotating the N-dimensional pattern data of the registration pattern through predetermined different angles. Collation Fourier N-dimensional pattern data is generated by performing N-dimensional discrete Fourier transform for N-dimensional pattern data of a collation pattern. The registration Fourier N-dimensional pattern data are read out in units of patterns. Each of the readout registration Fourier N-dimensional pattern data is synthesized with the collation Fourier N-dimensional pattern data. Either N-dimensional discrete Fourier transform or N-dimensional discrete inverse Fourier transform is performed for the resultant synthesized Fourier N-dimensional pattern data after amplitude suppression processing is performed therefor. Collation between the registration pattern and the collation pattern is performed on the basis of the intensities of the correlation components of the respective data constituting N-dimensional pattern data of a correlation component area appearing in the synthesized Fourier transformed N-dimensional pattern data.

According to this aspect, registration Fourier N-dimensional pattern data are generated by performing N-dimensional discrete Fourier transform for the N-dimensional pattern data of a registration pattern and a plurality of N-dimensional pattern data obtained by rotating the N-dimensional pattern data of the registration pattern through predetermined different angles. Registration Fourier N-dimensional pattern data are read out in units of patterns. Each of the readout pattern data is synthesized with collation Fourier N-dimensional pattern data. After amplitude suppression processing is performed for the resultant synthesized Fourier N-dimensional pattern data, N-dimensional discrete Fourier transform or N-dimensional discrete inverse Fourier transform is performed for the resultant data. Collation between the registration pattern and the collation pattern is performed on the basis of the intensities of the correlation components of the respective data constituting N-dimensional pattern data of a correlation component area appearing in the synthesized Fourier transformed N-dimensional pattern data.

According to the second aspect of the present invention (according to claim 2), registration Fourier N-dimensional pattern data is generated by performing N-dimensional discrete Fourier transform for N-dimensional pattern data of a registration pattern. The registration Fourier N-dimensional pattern data and a plurality of registration Fourier N-dimensional pattern data obtained by rotating the registration Fourier N-dimensional pattern data through predetermined different angles are set. Collation Fourier N-dimensional pattern data is generated by performing N-dimensional discrete Fourier transform for N-dimensional pattern data of a collation pattern. Registration Fourier N-dimensional pattern data are read out in units of patterns. Each of the readout registration Fourier N-dimensional pattern data is synthesized with the collation Fourier N-dimensional pattern data. Either N-dimensional discrete Fourier transform or N-dimensional discrete inverse Fourier transform is performed for the resultant synthesized Fourier N-dimensional pattern data after amplitude suppression processing is performed therefor. Collation between the registration pattern and the collation pattern is performed on the basis of the intensities of the correlation components of the respective data constituting N-dimensional pattern data of a correlation component area appearing in the synthesized Fourier transformed N-dimensional pattern data.

According to this aspect, registration Fourier N-dimensional pattern data is generated by performing N-dimensional discrete Fourier transform for N-dimensional pattern data of a registration pattern. This registration Fourier N-dimensional pattern data and a plurality of registration Fourier N-dimensional pattern data obtained by rotating the registration Fourier N-dimensional pattern data through predetermined different angles are set. Registration Fourier N-dimensional pattern data are read out in units of patterns. Each of the readout pattern data is synthesized with collation Fourier N-dimensional pattern data. After amplitude suppression processing is performed for the resultant synthesized Fourier N-dimensional pattern data, N-dimensional discrete Fourier transform or N-dimensional discrete inverse Fourier transform is performed for the resultant data. Collation between the registration pattern and the collation pattern is performed on the basis of the intensities of the correlation components of the respective data constituting N-dimensional pattern data of a correlation component area appearing in the synthesized Fourier transformed N-dimensional pattern data.

According to the third aspect of the present invention (according to claim 3), registration Fourier N-dimensional pattern data is generated by performing N-dimensional discrete Fourier transform for N-dimensional pattern data of a registration pattern. N-dimensional pattern data of a collation pattern and a plurality of N-dimensional pattern data obtained by rotating the N-dimensional pattern data of the collation pattern through predetermined different angles are set. Collation Fourier N-dimensional pattern data are generated by performing N-dimensional discrete Fourier transform for the N-dimensional pattern data of the collation pattern in units of patterns. The collation Fourier N-dimensional pattern data is synthesized with the registration Fourier N-dimensional pattern data. Either N-dimensional discrete Fourier transform or N-dimensional discrete inverse Fourier transform is performed for the resultant synthesized Fourier N-dimensional pattern data after amplitude suppression processing is performed therefor. Collation between the registration pattern and the collation pattern is performed on the basis of the intensities of the correlation components of the respective data constituting N-dimensional pattern data of a correlation component area appearing in the synthesized Fourier transformed N-dimensional pattern data.

According to this aspect, registration Fourier N-dimensional pattern data is generated by performing N-dimensional discrete Fourier transform for N-dimensional pattern data of a registration pattern. N-dimensional pattern data of a collation pattern and a plurality of N-dimensional pattern data obtained by rotating the N-dimensional pattern data of the collation pattern through predetermined different angles are set. Collation Fourier N-dimensional pattern data is generated by performing N-dimensional discrete Fourier transform in units of patterns. The collation Fourier N-dimensional pattern data, generated in units of patterns, is synthesized with the registration Fourier N-dimensional pattern data. After amplitude suppression processing is performed for the resultant synthesized Fourier N-dimensional pattern data, N-dimensional discrete Fourier transform or N-dimensional discrete inverse Fourier transform is performed for the resultant data. Collation between the registration pattern and the collation pattern is performed on the basis of the intensities of the correlation components of the respective data constituting N-dimensional pattern data of a correlation component area appearing in the synthesized Fourier transformed N-dimensional pattern data.

According to the fourth aspect of the present invention (according to claim 4), registration Fourier N-dimensional pattern data is generated by performing N-dimensional discrete Fourier transform for N-dimensional pattern data of a registration pattern. Collation Fourier N-dimensional pattern data is generated by performing N-dimensional discrete Fourier transform for N-dimensional pattern data of a collation pattern. The collation Fourier N-dimensional pattern data and a plurality of collation Fourier N-dimensional pattern data obtained by rotating the collation Fourier N-dimensional pattern data through predetermined different angles are set. The collation Fourier N-dimensional pattern data is synthesized with the registration Fourier N-dimensional pattern data in units of patterns. Either N-dimensional discrete Fourier transform or N-dimensional discrete inverse Fourier transform is performed for the resultant synthesized Fourier N-dimensional pattern data after amplitude suppression processing is performed therefor. Collation between the registration pattern and the collation pattern is performed on the basis of the intensities of the correlation components of the respective data constituting N-dimensional pattern data of a correlation component area appearing in the synthesized Fourier transformed N-dimensional pattern data.

According to this aspect, registration N-dimensional pattern data is generated by performing N-dimensional discrete Fourier transform for N-dimensional pattern data of a registration pattern. Collation Fourier N-dimensional pattern data is generated by performing N-dimensional discrete Fourier transform for N-dimensional pattern data of a collation pattern. The collation Fourier N-dimensional pattern data and a plurality of collation Fourier N-dimensional pattern data obtained by rotating the collation Fourier N-dimensional pattern data through predetermined different angles are set. The collation Fourier N-dimensional pattern data are synthesized with the registration Fourier N-dimensional pattern data in units of patterns. After amplitude suppression processing is performed for the resultant synthesized Fourier N-dimensional pattern data, N-dimensional discrete Fourier transform or N-dimensional discrete inverse Fourier transform is performed for the resultant data. Collation between the registration pattern and the collation pattern is performed on the basis of the intensities of the correlation components of the respective data constituting N-dimensional pattern data of a correlation component area appearing in the synthesized Fourier transformed N-dimensional pattern data.

According to the fifth aspect of the present invention (according to claim 5) to the eighth aspect of the present invention (according to claim 8), "Either N-dimensional discrete Fourier transform or N-dimensional discrete inverse Fourier transform is performed for the resultant synthesized Fourier N-dimensional pattern data after amplitude suppression processing is performed therefor." in the first to fourth aspects is replaced with "Either N-dimensional discrete Fourier transform or N-dimensional discrete inverse Fourier transform is performed for the resultant synthesized Fourier N-dimensional pattern data.", and amplitude suppression processing is performed for the respective data before they are synthesized.

According to the ninth aspect of the invention (according to claim 9), registration Fourier N-dimensional pattern data is generated by performing N-dimensional discrete Fourier transform for N-dimensional pattern data of a registration pattern. Collation Fourier N-dimensional pattern data is generated by performing N-dimensional discrete Fourier transform for N-dimensional pattern data of a collation pattern. Amplitude suppression processing is performed for the registration Fourier N-dimensional pattern data and the collation Fourier N-dimensional pattern data. The coordinate system of the registration Fourier N-dimensional pattern data and the collation Fourier N-dimensional pattern data, each having undergone the amplitude suppression processing, is converted into a polar coordinate system. The registration Fourier N-dimensional pattern data and the collation Fourier N-dimensional pattern data, whose coordinate system is converted into the polar coordinate system, are collated with each other. A rotation offset amount between the registration pattern and the collation pattern is obtained from the position of a correlation peak obtained in the process of collation. The registration pattern and the collation pattern are collated again by an amplitude suppression correlation method after rotation offset correction is performed with respect to one of the registration pattern and the collation pattern on the basis of the obtained rotation offset amount.

According to this aspect, registration Fourier N-dimensional pattern data ($R_F$) is generated by performing N-dimensional discrete Fourier transform for N-dimensional pattern data (R) of a registration pattern. Collation Fourier N-dimensional pattern data ($I_F$) is generated by performing N-dimensional discrete Fourier transform for N-dimensional pattern data (I) of a collation pattern. Amplitude suppression processing such as log processing or root processing is performed for the registration Fourier N-dimensional pattern data ($R_F$) and the collation Fourier N-dimensional pattern data ($I_F$). The coordinate system of the registration Fourier N-dimensional pattern data ($R_{FL}$) and the collation Fourier N-dimensional pattern data ($I_{FL}$), each having undergone the amplitude suppression processing, is converted into a polar coordinate system. The registration Fourier N-dimensional pattern data ($R_{PL}$) and the collation Fourier N-dimensional pattern data ($I_{PL}$), whose coordinate system is converted into the polar coordinate system, are collated with each other. A rotation offset amount ($\Delta\theta$) between the registration Fourier N-dimensional pattern data and the collation pattern is obtained from the position of a correlation peak obtained in the process of collation. The registration pattern and the collation pattern are collated again by an amplitude suppression correlation method after rotation offset correction is performed with respect to one of the registration pattern and the collation pattern on the basis of the obtained rotation offset amount ($\Delta\theta$).

According to the 11th aspect of the present invention (according to claim 11), phase signs are added to the amplitudes of registration Fourier N-dimensional pattern data and collation Fourier N-dimensional pattern data, each having undergone amplitude suppression processing, and the coordinate system of the respective data is converted into the polar coordinate system after only the amplitude components having the signs are extracted.

According to this aspect, registration Fourier N-dimensional pattern data ($R_F$) is generated by performing N-dimensional discrete Fourier transform for N-dimensional pattern data (R) of a registration pattern. Collation Fourier N-dimensional pattern data ($I_F$) is generated by performing N-dimensional discrete Fourier transform for N-dimensional pattern data (I) of a collation pattern. Amplitude suppression processing such as log processing or root processing is performed for the registration Fourier N-dimensional pattern data ($R_F$) and the collation Fourier N-dimensional pattern data ($I_F$). Phase signs are added to the amplitudes of the coordinate system of the registration Fourier N-dimensional pattern data ($R_{FL}$) and the collation Fourier N-dimensional pattern data ($I_{FL}$), each having undergone the amplitude suppression processing. After only the amplitude components having the signs are extracted ($R_{FL}'$, $I_{FL}'$), the coordinate system of the resultant data is converted into the polar coordinate system. The registration Fourier N-dimensional pattern data ($R_{PL}'$) and the collation Fourier N-dimensional pattern data ($I_{PL}'$), whose coordinate system is converted into the polar coordinate system, are collated with each other. A rotation offset amount ($\Delta\theta$) between the registration Fourier N-dimensional pattern data and the collation pattern is obtained from the position of a correlation peak obtained in the process of collation. The registration pattern and the collation pattern are collated again by an amplitude suppression correlation method after rotation offset correction is performed with respect to one of the registration pattern and the collation pattern on the basis of the obtained rotation offset amount ($\Delta\theta$).

According to the 13th aspect of the present invention (according to claim 13), after phase components are removed from registration Fourier N-dimensional pattern data and collation Fourier N-dimensional pattern data, amplitude suppression processing is performed for the registration Fourier N-dimensional pattern data and the collation Fourier N-dimensional pattern data, and the coordinate system of the registration Fourier N-dimensional pattern data and the collation Fourier N-dimensional pattern data, each having undergone the amplitude suppression processing, is converted into the polar coordinate system.

According to this aspect, registration Fourier N-dimensional pattern data ($R_F$) is generated by performing N-dimensional discrete Fourier transform for N-dimensional pattern data (R) of a registration pattern. Collation Fourier N-dimensional pattern data ($I_F$) is generated by performing N-dimensional discrete Fourier transform for N-dimensional pattern data (I) of a collation pattern. Amplitude suppression processing such as log processing or root processing is performed for the registration Fourier N-dimensional pattern data ($R_F$) and the collation Fourier N-dimensional pattern data ($I_F$) after phase components are removed therefrom. The coordinate system of the registration Fourier N-dimensional pattern data ($R_{FL}'$) and the collation Fourier N-dimensional pattern data ($I_{FL}'$), each having undergone amplitude suppression processing, is converted into the polar coordinate system. The registration Fourier N-dimensional pattern data ($R_{PL}'$) and the collation Fourier N-dimensional pattern data ($I_{PL}'$), whose coordinate system is converted into the polar coordinate system, are collated with each other. A rotation offset amount ($\Delta\theta$) between the registration Fourier N-dimensional pattern data and the collation pattern is obtained from the position of a correlation peak obtained in the process of collation. The registration pattern and the collation pattern are collated again by an amplitude suppression correlation method after rotation offset correction is performed with respect to one of the registration pattern and the collation pattern on the basis of the obtained rotation offset amount ($\Delta\theta$).

According to the 14th aspect of the present invention (according to claim 14), in the 9th to 13th aspects, if the correlation value of the correlation peak obtained in the process of collation performed by the amplitude suppression correlation collation means is larger than the predetermined threshold, collation between the registration pattern and the collation pattern is immediately performed.

According to this aspect, if the correlation value of the correlation peak obtained in the process of collation performed by the amplitude suppression correlation collation means is larger than the predetermined threshold, the collation result can be immediately obtained (coarse collation). In contrast to this, if the correlation value of the correlation peak obtained in the process of collation performed by the amplitude suppression correlation collation means is equal to or smaller than the predetermined threshold, the rotation offset amount ($\Delta\theta$) between the registration pattern and the collation pattern is obtained from the position of the correlation peak. After rotation offset correction is performed with respect to one of the registration pattern and the collation pattern on the basis of the rotation offset amount ($\Delta\theta$), the registration pattern and the collation pattern are collated again by the amplitude suppression correlation method (fine collation).

BRIEF DESCRIPTION OF THE DRAWINGS

FIGS. 1A to 1H are views how fingerprint collation is performed in a fingerprint collation apparatus of the present invention when it is determined that a registration fingerprint coincides with a collation fingerprint;

FIG. 4 is a flow chart for explaining the fingerprint collating operation (Embodiment 1) of this fingerprint collation apparatus;

FIG. 6 is a view showing examples of the numerical values of the intensities of the correlation components of the respective pixels in a correlation component area;

FIG. 14 is a flow chart for explaining a fingerprint collating operation in Embodiment 4;

FIG. 16 is a flow chart for explaining a fingerprint collating operation in Embodiment 5;

FIGS. 17A to 17G are views for explaining a coarse collation process in Embodiment 5;

FIGS. 18A and 18B are graphs for explaining conversion from the Cartesian coordinate system to the polar coordinate system;

FIG. 23 is a flow chart for explaining a fingerprint collating operation in Embodiment 6-1;

FIG. 25 is a flow chart for explaining a fingerprint collating operation in Embodiment 7;

FIGS. 26A to 26G are views for explaining a fingerprint collation process in Embodiment 7;

DESCRIPTION OF THE PREFERRED EMBODIMENTS

Embodiments of the present invention will be described in detail below.

[Embodiment 1: First Aspect]

Figure 2:
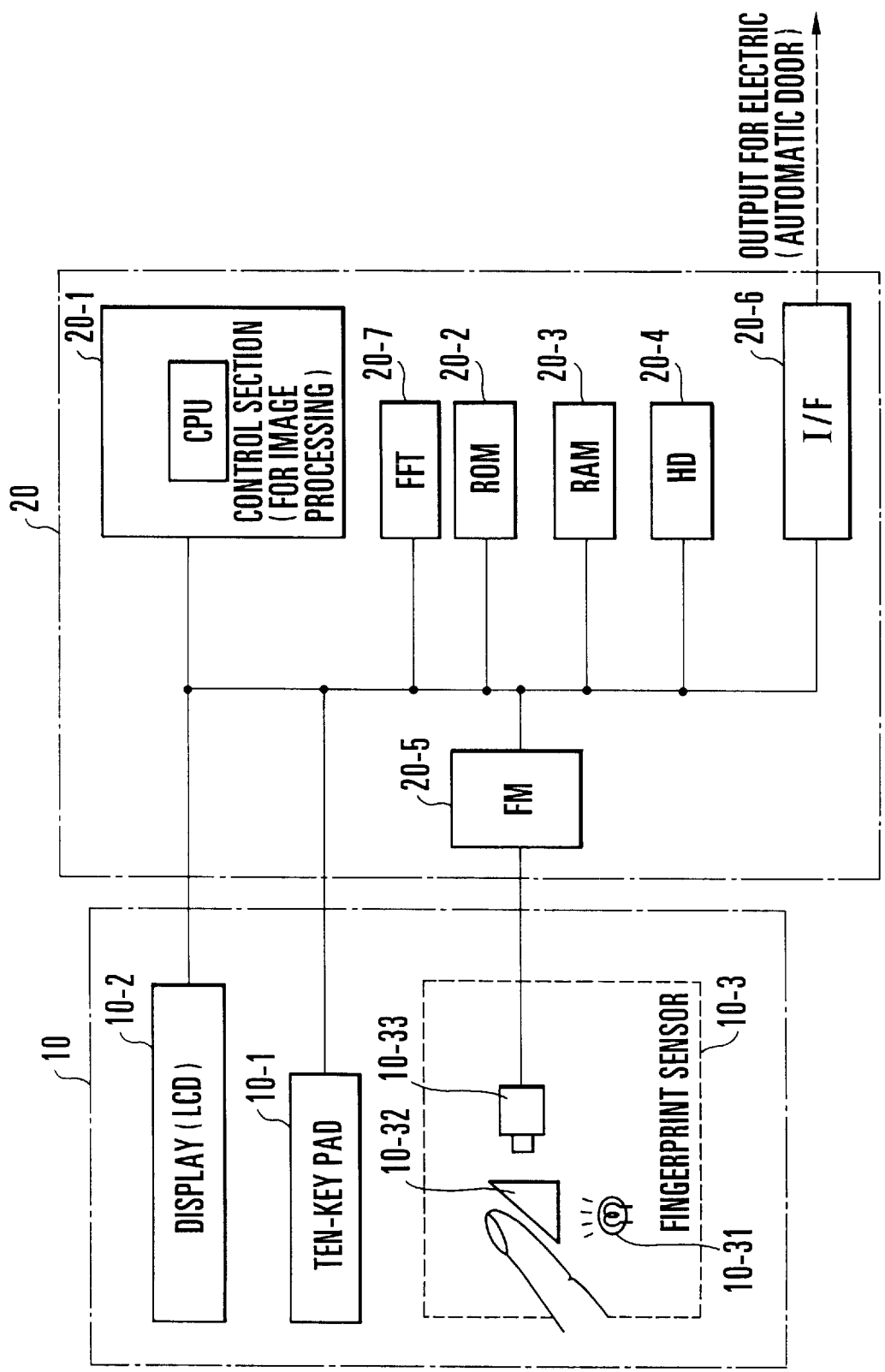
FIG. 2 is a block diagram showing the arrangement of this fingerprint collation apparatus.

FIG. 2 shows the arrangement of a fingerprint collation apparatus (two-dimensional pattern collation apparatus) according to an embodiment of the present invention. Referring to FIG. 2, reference numeral 10 denotes an operation unit; and 20, a control unit. The operation unit 10 includes a ten-key pad 10-1, a display (LCD) 10-2, and a fingerprint sensor 10-3. The fingerprint sensor 10-3 is constituted by a light source 10-31, a prism 10-32, and a CCD camera 10-33. The control unit 20 is constituted by a control section 20-1 including a CPU, a ROM 20-2, a RAM 20-3, a hard disk (HD) 20-4, a frame memory (FM) 20-5, an external connection section (I/F) 20-6, and a Fourier transform section (FFT) 20-7. Registration and collation programs are stored in the ROM 20-2.

[Registration of Fingerprint]

In this fingerprint collation apparatus, the fingerprint of a user is registered in the following manner. Before using the apparatus, the user inputs the ID number assigned thereto with the ten-key pad 10-1 (step 301 in FIG. 3), and puts his/her finger on the prism 10-32 of the fingerprint sensor 10-3. The prism 10-32 is irradiated with light from the light source 10-31. The light from the prism 10-32 is totally reflected by the recess portions (groove portions), of the skin surface, which are not in contact with the surface of the prism 10-32, and is incident on the CCD camera 10-33. In contrast to this, at the projection portions (ridge portions), of the skin surface, which are in contact with the surface of the prism 10-32, the total reflection conditions are not satisfied, and the light from the light source 10-31 is scattered. As a result, the groove portions become bright, but the ridge portions become dark. That is, a fingerprint pattern with a contrast is obtained. This obtained pattern of the fingerprint (registration fingerprint) is A/D-converted into a 256-gradation level halftone image (image data: two-dimensional pattern data) constituted by 320×400 pixels. The resultant data is supplied to the control unit 20.

Figure 5:
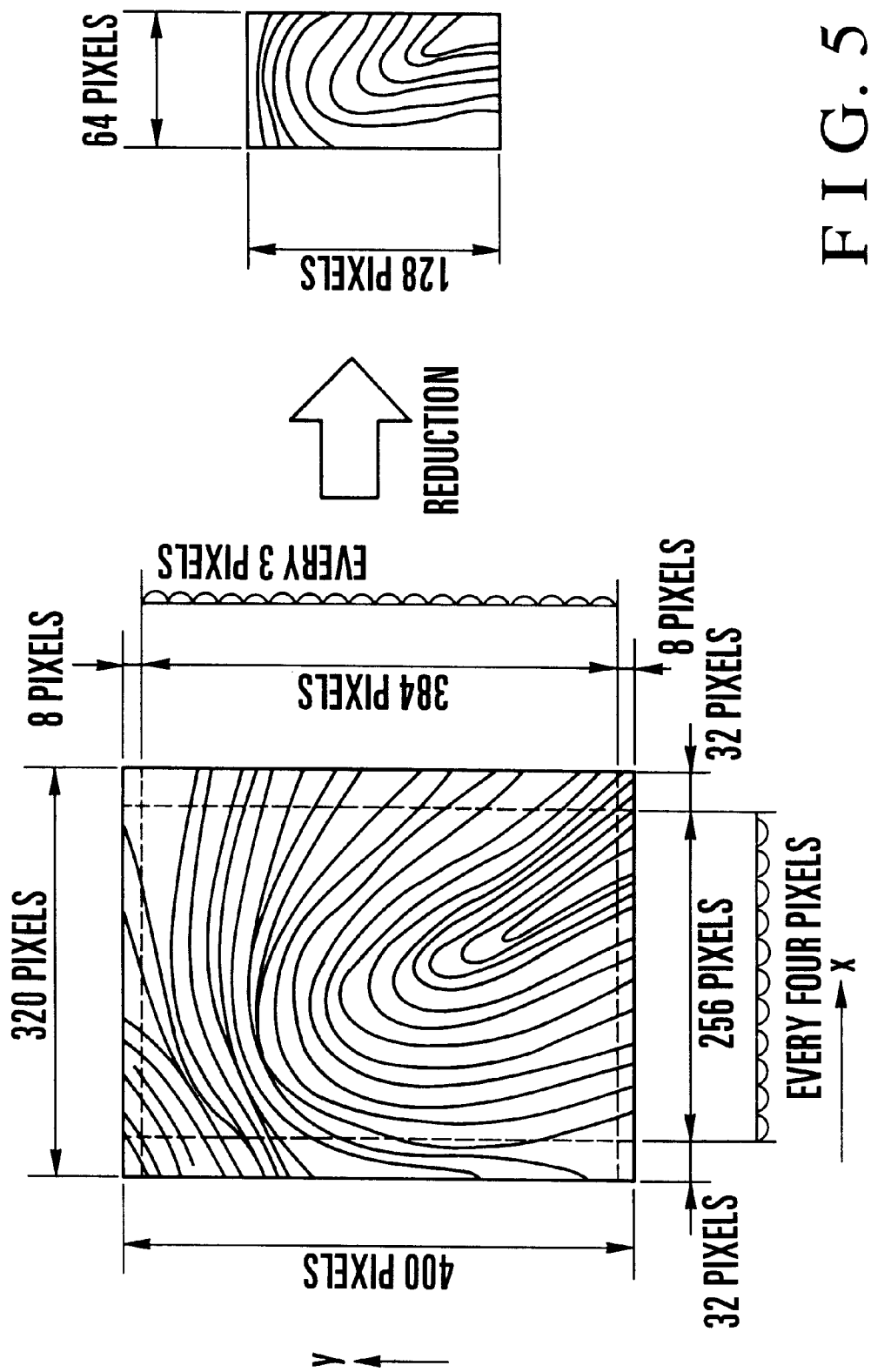
FIG. 5 is a view for explaining reduction processing for image data.

The control section 20-1 loads the registration fingerprint image data supplied from the operation unit 10 through the frame memory 20-5 (step 302), and performs reduction processing for the loaded registration fingerprint image data (step 303). This reduction processing is performed for the 320×400-pixel, 256-gradation level original image data such that 32-pixel left and right end portions are subtracted from the image data in the x direction (horizontal direction), and the resultant image data is thinned out at a 4-pixel pitch, whereas 8-pixel upper and lower end portions are extracted from the image data in the y direction (vertical direction), and the resultant image data is thinned out at a 3-pixel pitch. With this processing, the registration fingerprint image data is reduced to 64×128-pixel, 256-gradation level image data (see FIG. 5).

The control section 20-1 sets m=i (i=−90 in this case) (step 304), and checks whether m·a≦K (a=1 and K=+90 in this case) (step 305). If m·a≦K, the registration fingerprint image data reduced in step 303 is rotated through m·a degrees (step 306). The registration fingerprint image data rotated through m·a degrees is sent to the Fourier transform section 20-7 to be subjected to two-dimensional discrete Fourier transform (DFT) (step 307).

With this operation, the registration fingerprint image data becomes Fourier image data (registration Fourier image data). The control section 20-1 files this registration Fourier image data as registration Fourier image data with m=i in the hard disk 20-4 in correspondence with the ID number (step 308). The control section 20-1 then sets m=m+1 (step 309), and repeats the processing in step 305 and the subsequent steps. With repetition of this processing, registration Fourier image data with m=−90 to +90 are filed as registration Fourier image data in the hard disk 20-4 in correspondence with the ID number.

For example, two-dimensional discrete Fourier transform is described in "Introduction to Computer Image Processing", edited by Nihon Kogyo Gijutu Center, published by Souken Shuppan, pp. 44 to 45 (reference 1) and the like.

[Collation of Fingerprints]

In this fingerprint collation apparatus, collation of the fingerprint of the user is performed in the following manner. During the operation of the apparatus, the user inputs the ID number assigned thereto with the ten-key pad 10-1 (step 401), and puts his/her finger on the prism 10-32 of the fingerprint sensor 10-3. With this operation, as in the case of the registration of the fingerprint, the obtained pattern of the collation fingerprint (subjected to collation) is supplied as 320×400-pixel, 256-gradation level halftone image (image data: two-dimensional pattern data) to the control unit 20.

Upon reception of the ID number through the ten-key pad 10-1, the control section 20-1 sets m=i (i=−90 in this case) (step 402), and reads out the registration Fourier image data with m=i which corresponds to the ID number from the registration Fourier image data filed in the hard disk 20-4 (step 403). That is, the registration Fourier image data obtained by rotating the registration fingerprint image data through m·a degrees, and performing two-dimensional discrete Fourier transform for the registration fingerprint image data rotated through m·a degrees is read out from the registration Fourier image data in the hard disk 20-4.

The control section 20-1 loads the collation fingerprint image data supplied from the operation unit 10 through the frame memory 20-5 (step 404), and performs the same reduction processing as that in step 303 for the loaded collation fingerprint image data (step 405). With this processing, the collation fingerprint image data is reduced to 64×128-pixel, 256-gradation level image data.

The control section 20-1 sends this reduced collation fingerprint image data to the Fourier transform section 20-7 to perform two-dimensional discrete Fourier transform (DFT) for the collation fingerprint image data (step 406). With this operation, the collation fingerprint image data becomes Fourier image data (collation Fourier image data).

The control section 20-1 synthesizes the collation fingerprint Fourier image data obtained in step 406 with the registration fingerprint Fourier image data read out in step 403 (step 407) to obtain synthesized Fourier image data.

Letting $A \cdot e^{j\theta}$ be the collation fingerprint Fourier image data, and $B \cdot e^{j\phi}$ be the registration fingerprint Fourier image data, this synthesized fingerprint image data is represented by $A \cdot B \cdot e^{j(\theta-\phi)}$. Note that A, B, $\theta$, and $\phi$ are the functions of a frequency (Fourier) space (u, v).

$A \cdot B \cdot e^{j(\theta-\phi)}$ is rewritten as $$A \cdot B \cdot e^{j(\theta-\phi)} = A \cdot B \cdot \cos(\theta-\phi) + j \cdot A \cdot B \cdot \sin(\theta-\phi) \quad (1)$$

If $A \cdot e^{j\theta} = \alpha_1 + j\beta_1$ and $B \cdot e^{j\phi} = \alpha_2 + j\beta_2$, then $A = (\alpha_1^2 + \beta_1^2)^{1/2}$, $B = (\alpha_2^2 + \beta_2^2)^{1/2}$, $\theta = \tan^{-1}(\beta_1/\alpha_1)$, and $\phi = \tan^{-1}(\beta_2/\alpha_2)$. By calculating equation (1), synthesized Fourier image data is obtained.

Note that synthesized Fourier image data may be obtained according to $A \cdot B \cdot e^{j(\theta-\phi)} = A \cdot B \cdot e^{j\theta} \cdot e^{-j\phi} = A \cdot e^{j\theta} \cdot B \cdot e^{-j\phi} = (\alpha_1 + j\beta_1) \cdot (\alpha_2 - j\beta_2) = (\alpha_1 \cdot \alpha_2 + \beta_1 \cdot \beta_2) + j(\alpha_2 \cdot \beta_1 - \alpha_1 \cdot \beta_2)$.

After the synthesized Fourier image data is obtained in this manner, the control section 20-1 performs amplitude suppression processing for the image data (step 408). In this embodiment, log processing is performed as amplitude suppression processing. More specifically, the log of $A \cdot B \cdot e^{j(\theta-\phi)}$, which is the mathematical expression of the above synthesized Fourier image data, is calculated as $\log(A \cdot B) \cdot e^{j(\theta-\phi)}$, thereby suppressing $A \cdot B$ representing the amplitude to $\log(A \cdot B)$ ($A \cdot B > \log(A \cdot B)$).

The synthesized Fourier image data having undergone amplitude suppression processing is less susceptible to the illuminance difference between the case in which the registration fingerprint data is obtained and the case in which the collation fingerprint data is obtained. That is, by performing amplitude suppression processing, the spectrum intensity of each pixel is suppressed to cut extreme values. As a result, more information is made effective. In addition, when amplitude suppression processing is performed, feature points (end points and branch points) and ridge portion characteristics (loops and arches), i.e., the individual information of the fingerprint information, are emphasized, whereas the overall flow/direction data of the ridge portions, i.e., the general fingerprint information, are suppressed.

In this embodiment, log processing is performed as amplitude suppression processing. However, root processing may be performed. In addition, any type of processing, other than log processing and root processing, may be performed as long as amplitudes can be suppressed. If, for example, all amplitudes are set to 1 in amplitude suppression processing, i.e., only phase data are to be processed, both the computation amount and the amount of data processed can be reduced as compared with log processing, root processing, and the like.

Upon performing amplitude suppression processing in step 408, the control section 20-1 sends the synthesized Fourier image data having undergone the amplitude suppression processing to the Fourier transform section 20-7 to perform second two-dimensional discrete Fourier transform (DFT) (step 409).

The control section 20-1 loads the synthesized Fourier image data having undergone two-dimensional discrete Fourier transform, which is obtained in step 409, and scans the intensities (amplitudes) of the correlation components of the respective pixels in a predetermined correlation component area from this synthesized Fourier image data to obtain the histogram of the intensities of the correlation components of the respective pixels. The control section 20-1 then extracts n pixels (eight pixels in this embodiment) having higher correlation component intensities from this histogram, and obtains the average of the correlation component intensities of the n extracted pixels as a correlation value (score) (step 410).

The control section 20-1 compares the correlation value obtained in step 410 with a predetermined threshold (step 411). If the correlation value is larger than the threshold, the control section 20-1 determines that the registration fingerprint coincides with the collation fingerprint (step 412). The control section 20-1 then displays corresponding information and sends an output for an electric lock. If the correlation value is equal to or smaller than the threshold, the control section 20-1 checks whether m·a<K (a=1 and K=+90 in this embodiment) (step 413). If m·a<K, the control section 20-1 sets m=m+1 (step 414), and repeats the processing in step 403 and the subsequent steps.

With repetition of the processing in step 403 and the subsequent steps, registration Fourier image data are read out from the registration Fourier image data in the hard disk 20-4 in units of patterns, and each of the read registration Fourier image data is synthesized with the collation Fourier image data. Amplitude suppression processing is performed for the resultant synthesized Fourier image data, and two-dimensional discrete Fourier transform is performed for the resultant image data. Collation between the registration fingerprint and the collation fingerprint is performed on the basis of the intensities of the correlation components of the respective pixels in a correlation component area appearing in the synthesized Fourier image data having undergone this two-dimensional discrete Fourier transform.

In this embodiment, essentially, collation between a registration fingerprint and a collation fingerprint is performed while the collation fingerprint is fixed, and the registration fingerprint is rotated clockwise degree by degree from −90 degrees. In this case, if the registration fingerprint coincides with the collation fingerprint before the rotation angle reaches +90 degrees, i.e., it is determined in step 411 that the correlation value becomes larger than the threshold, collation between the registration fingerprint and the collation fingerprint is complete. In contrast to this, if the registration fingerprint does not coincide with the collation fingerprint when the rotation angle reaches +90 degrees, NO is obtained in step 413, and it is determined that the registration fingerprint does not coincides with the collation fingerprint (step 415). Corresponding information is then displayed.

FIGS. 1A to 1H show how fingerprint collation is performed when it is determined that a registration fingerprint coincides with a collation fingerprint. FIG. 1E shows the image data of the collation fingerprint. FIG. 1A shows the image data of the registration fingerprint rotated through m·a degrees. FIG. 1B shows the registration Fourier image data obtained by performing two-dimensional discrete Fourier transform for the image data in FIG. 1A. FIG. 1F shows the collation Fourier image data obtained by performing two-dimensional discrete Fourier transform for the image data in FIG. 1E. FIG. 1D shows the synthesized Fourier image data obtained by synthesizing the image data in FIG. 1D with the image data in FIG. 1B. FIG. 1H shows the synthesized Fourier image data obtained by performing two-dimensional discrete Fourier transform for the image data in FIG. 1D.

Referring to FIG. 1H, a correlation component area is defined as an area S0 enclosed with the white dotted line. FIG. 6 shows examples of the numerical values of the intensities of the correlation components of the respective pixels in a portion in this correlation component area S0. Referring to FIG. 6, the encircled values are the higher intensities of the correlation components of the eight pixels. The average of the higher intensities of the eight pixels is obtained as a correlation value (score). In this case, the obtained correlation value becomes larger than the predetermined threshold, and it is determined that the registration fingerprint coincides with the collation fingerprint.

Figure 7:
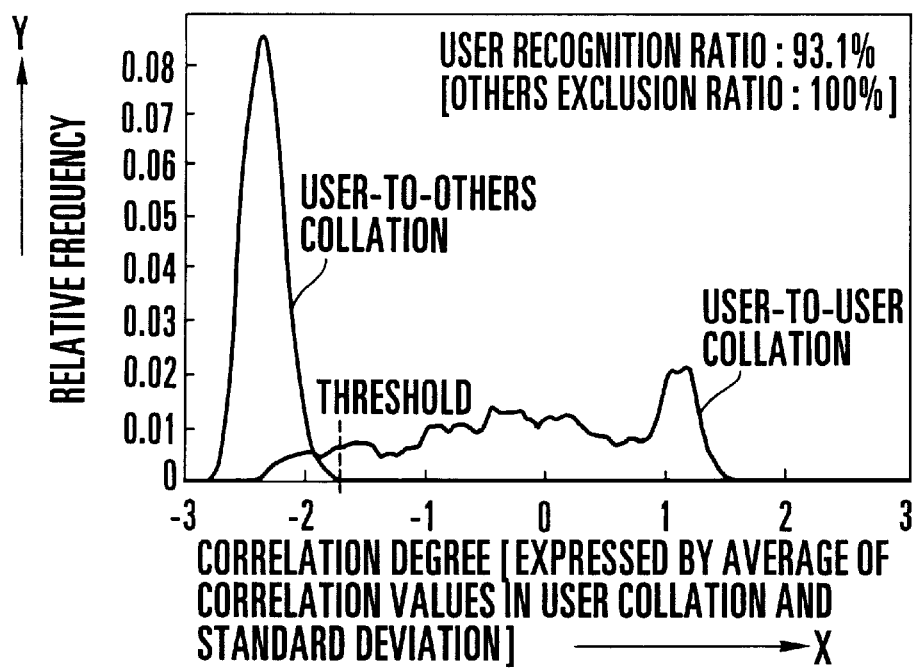
FIG. 7 is a graph showing the relative frequency distributions of correlation values in user-to-user collation and user-to-others collation which are obtained from experimental results.

In this case, the threshold to be compared with the correlation value is obtained as follows. The fingerprints of the index fingers of 10 males and females in twenties to fifties as samples are input 10 times each to obtain a total of 100 fingerprints. The 100 fingerprints are used for registration and collation, and collation is performed 10,000 times. The threshold is then obtained from this collation result. FIG. 7 shows the relative frequency distributions of correlation values in user-to-user collation and user-to-others collation. The X-axis represents the correlation degree expressed by an average value $\mu$ and a standard deviation $\sigma$ in user-to-user collation, whereas the Y-axis represents the relative frequency. The correlation value corresponding to an others exclusion ratio of 100% is used as a threshold. Note that the others exclusion ratio need not be 100%, and may be set to an arbitrary ratio in accordance with a purpose.

Figure 8:
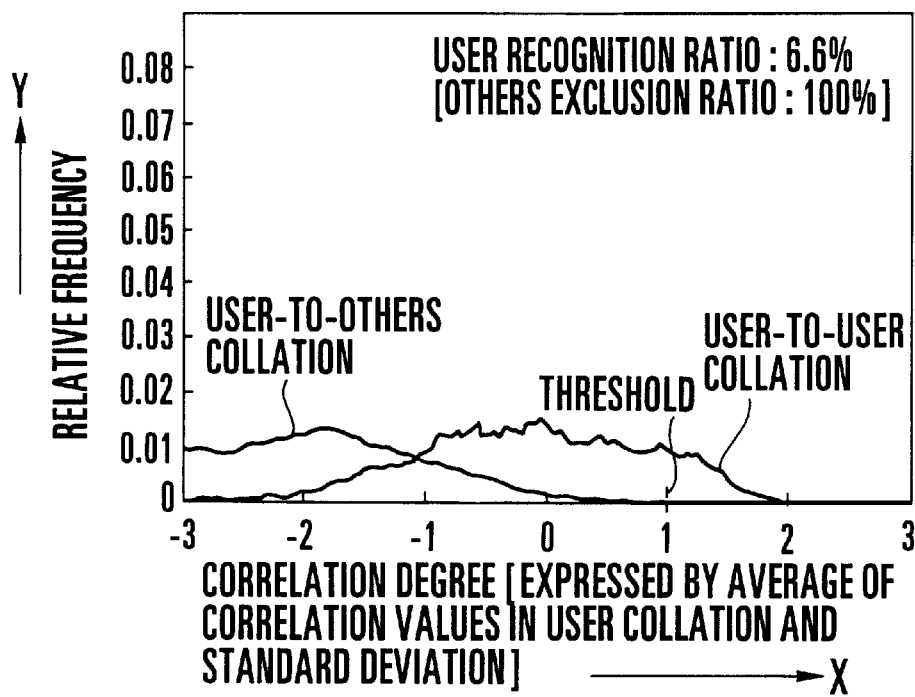
FIG. 8 is a graph showing the relative frequency distributions of correlation values in user-to-user collation and user-to-others collation which are obtained when no amplitude suppression processing is performed.

FIG. 8 shows the relative frequency distributions of correlation values in user-to-user collation and user-to-others collation without amplitude suppression processing. In this embodiment, since amplitude suppression processing is performed in step 407, the synthesized Fourier image data is less susceptible to the illuminance difference between the case in which the registration fingerprint data is obtained and the case in which the collation fingerprint data is obtained. In addition, the feature points (end points and branch points) and ridge portion characteristics (loops and arches), i.e., the individual information of the fingerprint information, are more emphasized to greatly improve the collation precision. That is, the user recognition ratio is 6.6% when the others exclusion ratio is 100% in the case shown in FIG. 8, but the user recognition ratio is 93.1% when the others exclusion ratio is 100% in the case shown in FIG. 7.

In this embodiment, n pixels having higher correlation component intensities are extracted from the pixels in the correlation component area S0, and the average of the intensities is set as a correlation value. However, the sum of the higher correlation component intensities of the n pixels may be set as a correlation value. In addition, all the correlation component intensities of pixels which exceed a threshold may be added, and the sum may be set as a correlation value, or the average of the sum may be set as a correlation value. If at least one of the correlation component intensities of the pixels is equal to or larger than a threshold, "coincidence" may be determined. Alternatively, if n or more pixels have correlation component intensities exceeding a threshold, "coincidence" may be determined. Various other determination methods are available.

In this embodiment, two-dimensional discrete Fourier transform is performed in the Fourier transform section 20-7. However, this processing may be performed in the control section 20-1. In addition, in the embodiment, reduction processing is performed for the registration fingerprint image data in step 303. However, reduction processing may be performed in a step after the registration fingerprint Fourier image data is read out (between steps 403 and 404). Reduction processing need not always be performed for registration and collation fingerprint image data; Fourier image data may be directly formed from input image data. If reduction processing is performed, the capacity of an image memory to be used to process input image data can be reduced.

In this embodiment, two-dimensional discrete Fourier transform is performed in step 409 in FIG. 4. However, instead of two-dimensional discrete Fourier transform, two-dimensional discrete inverse Fourier transform may be performed. More specifically, instead of performing two-dimensional discrete Fourier transform for synthesized Fourier image data having undergone amplitude suppression processing, two-dimensional discrete inverse Fourier transform may be performed. Quantitatively, no change in collation precision occurs whether two-dimensional discrete Fourier transform or two-dimensional discrete inverse Fourier transform is performed. Processing based on two-dimensional discrete inverse Fourier transform is disclosed in reference 1.

Figures 9A, 9B:
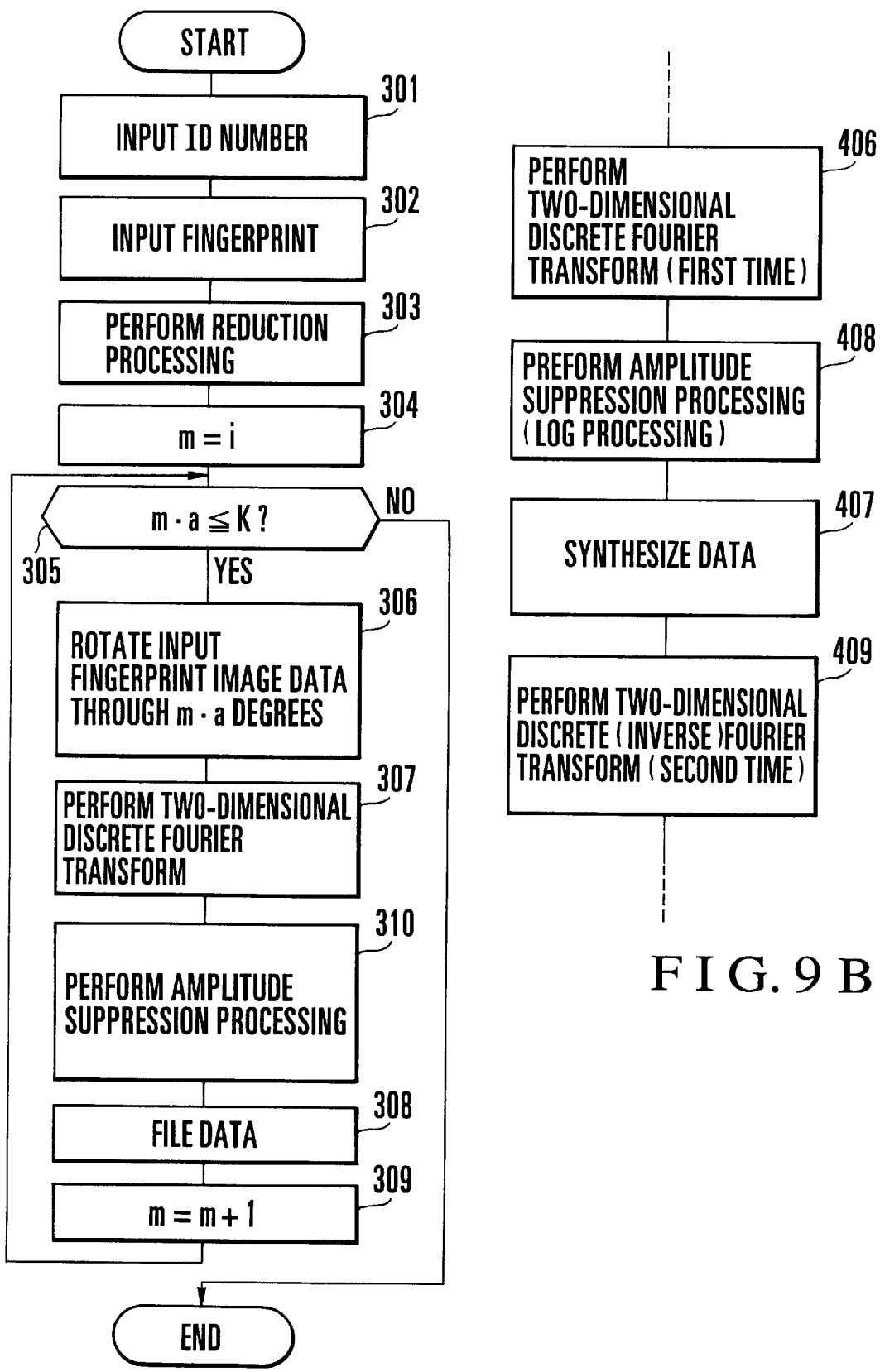
FIG. 9 is a flow chart for explaining other examples of the fingerprint registering and collating operations in Embodiment 1.
Figure 10:
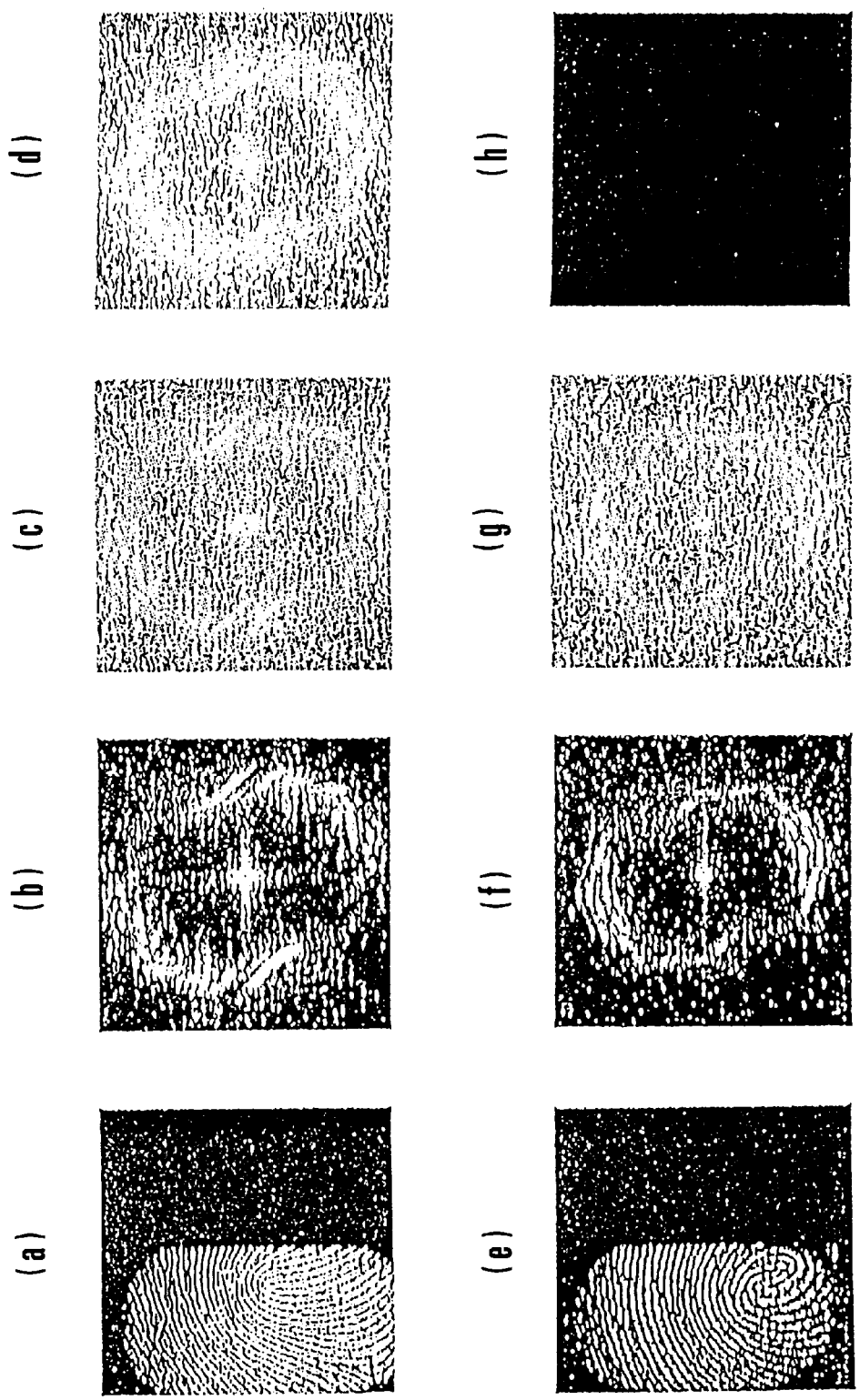
FIGS. 10A to 10H are views corresponding to FIGS. 1A to 1H and showing how fingerprint collation is performed when a collation fingerprint is another person's fingerprint.

In this embodiment, amplitude suppression processing is performed first for synthesized Fourier image data, and two-dimensional discrete Fourier transform is then performed (steps 408 and 409). However, amplitude suppression processing may be performed for the registration fingerprint and collation fingerprint Fourier image data before synthesis, and the resultant data may be synthesized. More specifically, step 310 of performing amplitude suppression processing may be set between steps 306 and 307 in FIG. 3, as shown in FIG. 9A, and steps 407 and 408 in FIG. 4 may be interchanged, as shown in FIG. 9B.

In this case, registration fingerprint Fourier image data (registration Fourier image data) having undergone amplitude suppression processing like the one shown in FIG. 1C is obtained by amplitude suppression processing in step 310, and collation fingerprint Fourier image data (collation Fourier image data) having undergone amplitude suppression processing like the one shown in FIG. 1G is obtained by interchanging steps 407 and 408. The registration fingerprint Fourier image data and the collation fingerprint Fourier image data, each having undergone amplitude suppression processing, are synthesized to obtain synthesized Fourier image data like the one shown in FIG. 1D.

The suppression ratio of the amplitude of the synthesized Fourier image data is low as compared with the case in which amplitude suppression processing is performed after synthesized Fourier image data is generated (FIG. 4). Therefore, the method of performing amplitude suppression processing after synthesized Fourier image data is generated (FIG. 4) is superior in collation precision to the method of generating synthesized Fourier image data after performing amplitude suppression processing (FIG. 9). In the case in which synthesized Fourier image data is generated after amplitude suppression processing is performed (FIG. 9), two-dimensional discrete inverse Fourier transform may be performed for the synthesized Fourier image data instead of two-dimensional discrete Fourier transform.

FIGS. 10A to 10H show a fingerprint collation state corresponding to the state shown in FIGS. 1A to 1H. In this state, a collation fingerprint is an another person's fingerprint. FIGS. 1A to 1H show the fingerprint collation state in which the collation fingerprint is the user's fingerprint. When the collation fingerprint is the user's fingerprint, the correlation component area S0 includes a portion in which the correlation component intensities are high. In contrast to this, when the collation fingerprint is another person's fingerprint, such a portion is not formed. More specifically, when the collation fingerprint is the user's fingerprint, and the registration fingerprint image data is rotated clockwise degree by degree from −90 degrees, a portion with high correlation component intensities is formed in the correlation component area S0 at some rotation angle between −90 degrees and +90 degrees. In contrast to this, when the collation fingerprint is another person's fingerprint, and the registration fingerprint image data is rotated clockwise degree by degree from −90 degrees, such a portion with high correlation component intensities is not formed in the correlation component area S0 between −90 degrees and +90 degrees.

This embodiment has been described by taking fingerprint collation as an example. However, the present invention can be equally applied to voiceprint collation. That is, the present invention can be applied to various types of two-dimensional patterns, other than voiceprints and fingerprints, as long as the patterns can be processed as image data.

In this embodiment, two-dimensional patterns are obtained as images. However, such patterns need not always be obtained as images. For example, vibration detectors may be two-dimensionally arranged in some places, and a two-dimensional pattern (seismic waves) obtained by the two-dimensionally arranged vibration detectors may be used as a collation pattern, which is collated with preregistration patterns. In addition, flowmeters may be two-dimensionally arranged at some portions, and a two-dimensional pattern (flow rate distribution) obtained by the two-dimensionally arranged flowmeters may be used as a collation pattern, which is collated with preregistration patterns.

Furthermore, in this embodiment, two-dimensional pattern collation has been described. However, the present invention can also be applied to three-dimensional pattern collation. In addition, the present invention can be applied to collation of multidimensional patterns, other than two- and three-dimensional patterns.

[Embodiment 2: Second Aspect]

In Embodiment 1, registration fingerprint image data is rotated through m·a degrees, and two-dimensional discrete Fourier transform is performed for the registration fingerprint image data rotated through m·a degrees. The registration Fourier image data obtained with m=−90 to +90 are filed as registration Fourier image data. In contrast to this, in Embodiment 2, two-dimensional discrete Fourier transform is performed for registration fingerprint image data to generate registration fingerprint image data, and the registration Fourier image data is rotated through m·a degrees. The registration Fourier image data obtained with m=−90 to +90 are filed as registration Fourier image data.

Figure 3:
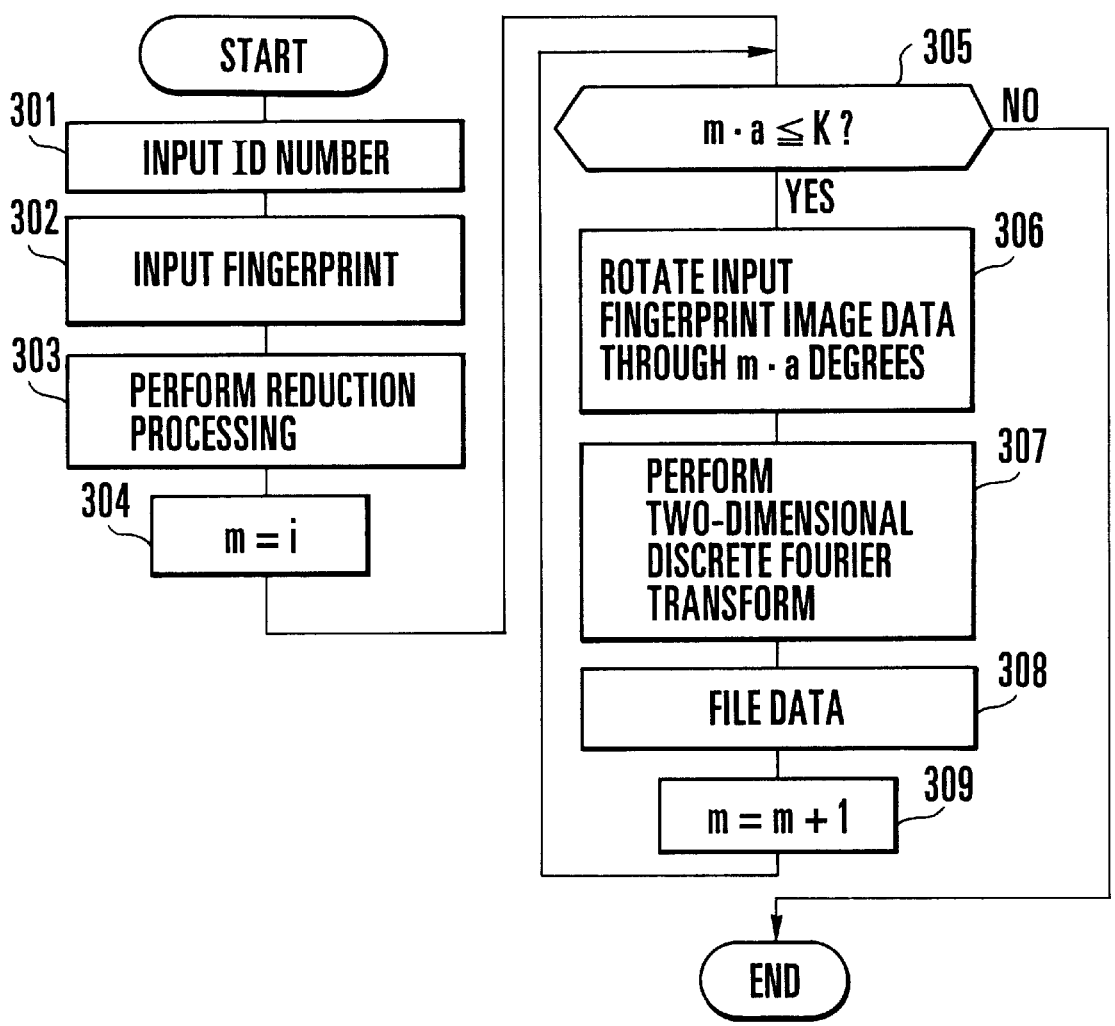
FIG. 3 is a flow chart for explaining the fingerprint registering operation (Embodiment 1) of this fingerprint collation apparatus.
Figure 11:
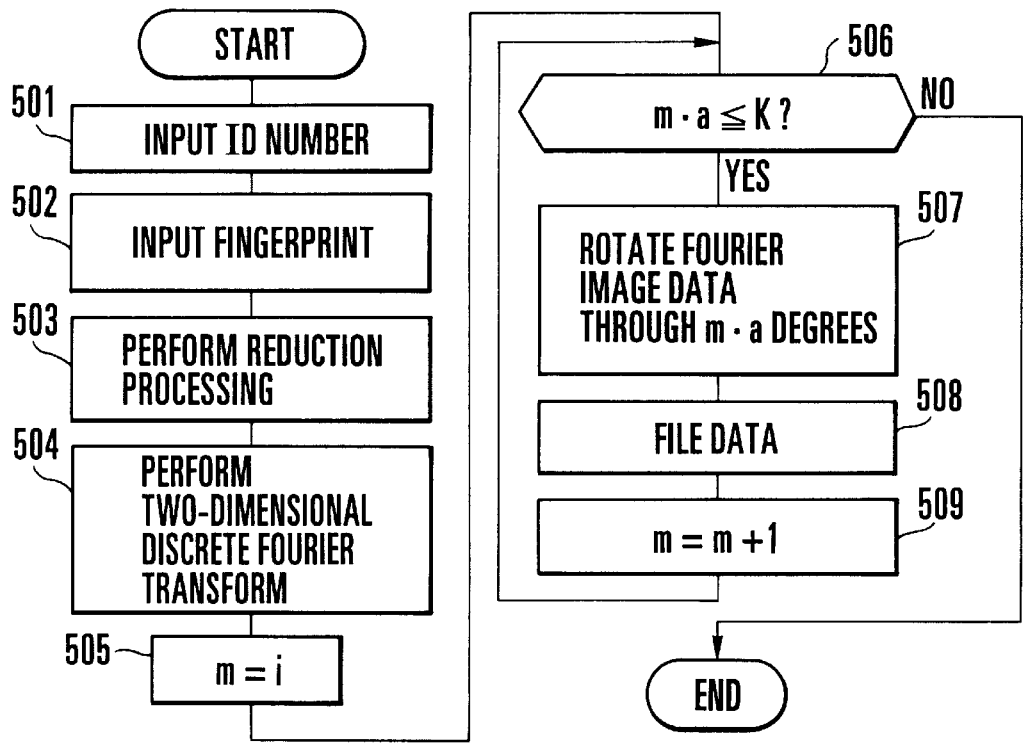
FIG. 11 is a flow chart for explaining a fingerprint registering operation in Embodiment 2.

As shown in FIG. 11, the processing in steps 501, 502, and 503 is performed in correspondence with steps 301, 302, and 303 in FIG. 3, and two-dimensional discrete Fourier transform is performed for the registration fingerprint image data obtained in step 503 (step 504) to obtain registration Fourier image data. Thereafter, m=i (i=−90 in this case) is set (step 505), and it is checked whether m·a≦K (a=1 and K=+90 in this case) (step 506). If m·a≦K, the registration Fourier image data obtained in step 504 is rotated through m·a degrees (step 507). The registration Fourier image data rotated through m·a degrees is filed as registration Fourier image data with m=i in correspondence with the ID number (step 508), and m=m+1 is set (step 509). The processing in step 506 and the subsequent steps is then repeated. With repetition of this processing, the registration Fourier image data obtained with m=−90 to +90 are filed as registration Fourier image data in correspondence with the ID number.

Since fingerprint collation processing in Embodiment 2 is the same as that in Embodiment 1 (the flow chart of FIG. 4), a description thereof will be omitted. In this embodiment, as in Embodiment 1, essentially, collation between a registration fingerprint and a collation fingerprint is performed while the collation fingerprint is fixed, and the registration fingerprint is rotated clockwise degree by degree from −90 degrees.

[Embodiment 3: Third Aspect]

In Embodiments 1 and 2, essentially, collation between a registration fingerprint and a collation fingerprint is performed while the collation fingerprint is fixed, and the registration fingerprint is rotated clockwise degree by degree from −90 degrees. In contrast to this, in Embodiment 3, essentially, collation between a registration fingerprint and a collation fingerprint is performed while the registration fingerprint is fixed, and the collation fingerprint is rotated clockwise degree by degree from −90 degrees.

[Registration of Fingerprint]

Figure 12:
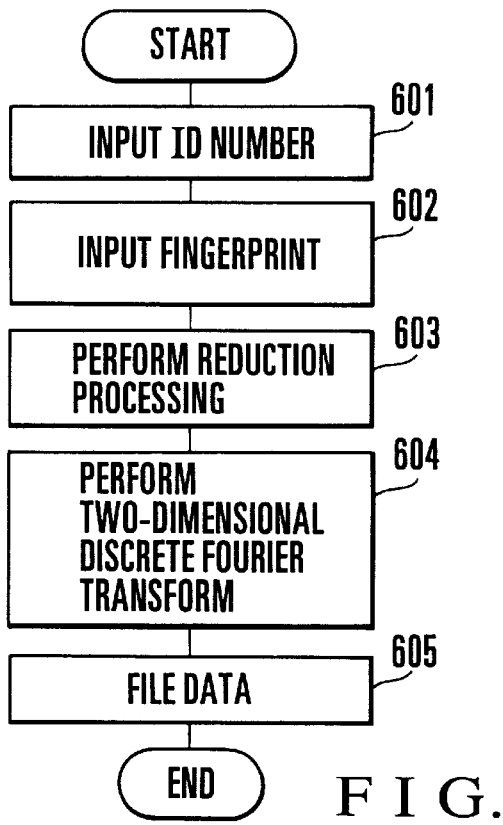
FIG. 12 is a flow chart for explaining a fingerprint registering operation in Embodiment 3.

In Embodiment 3, as shown in the flow chart of FIG. 12, the processing in steps 601, 602, 603, and 604 is performed in correspondence with steps 501, 502, 503, and 504 in FIG. 11, and the registration Fourier image data obtained in step 604 is filed as the original image data of the registration fingerprint in a hard disk 20-4 in correspondence with the ID number (step 605).

[Collation of Fingerprints]

During the operation of the apparatus, the user inputs the ID number assigned thereto with a ten-key pad 10-1 (step 701 in FIG. 13), and puts his/her finger on a prism 10-32 of a fingerprint sensor 10-3. With this operation, as in the case of fingerprint registration, the obtained fingerprint (collation fingerprint) pattern is supplied as image data to a control unit 20.

Upon reception of the ID number through the ten-key pad 10-1, a control section 20-1 reads out the registration Fourier image data filed in the hard disk 20-4 (step 702). The control section 20-1 also loads the collation fingerprint image data supplied from an operation unit 10 through a frame memory 20-5 (step 703), and performs reduction processing for the loaded collation fingerprint image data (step 704).

The control section 20-1 sets m=i (i=−90 in this case) (step 705), and rotates the collation fingerprint image data reduced in step 704 through m·a degrees (step 706). The control section 20-1 performs two-dimensional discrete Fourier transform for the collation fingerprint image data rotated through m·a degrees (step 707) to obtain collation Fourier image data with m=i.

The control section 20-1 synthesizes the collation Fourier image data obtained in step 706 with the registration Fourier image data read out in step 702 (step 708) to obtain synthesized Fourier image data. The control section 20-1 performs amplitude suppression processing (log processing) for the synthesized Fourier image data (step 709), and performs second two-dimensional discrete Fourier transform for the synthesized Fourier image data having undergone this amplitude suppression processing (step 710).

The control section 20-1 scans the intensities (amplitudes) of the correlation components of the respective pixels in a predetermined correlation area of the synthesized Fourier image data having undergone two-dimensional discrete Fourier transform in step 710 to obtain the histogram of the intensities of the correlation components of the respective pixels. The control section 20-1 then extracts n (eight in this embodiment) pixels having higher correlation component intensities from this histogram, and obtains the average of the correlation component intensities of the extracted n pixels as a correlation value (score) (step 711).

The control section 20-1 compares the correlation value obtained in step 711 with a predetermined threshold (step 712). If the correlation value is larger than the threshold, the control section 20-1 determines that the registration fingerprint coincides with the collation fingerprint (step 713). The control section 20-1 then displays corresponding information and sends an output for an electric lock. If the correlation value is equal to or smaller than the threshold, the control section 20-1 checks whether m·a<K (a=1 and K=+90 in this case) (step 714). If m·a<K, the control section 20-1 sets m=m+1 (step 715), and repeats the processing in step 706 and the subsequent steps.

With repetition of the processing in step 706 and the subsequent steps, the collation fingerprint image data rotated through m·a degrees with m=−90 to +90 are set as rotated collation fingerprint image data, and two-dimensional discrete Fourier transform is performed for the rotated collation fingerprint image data in units of patterns to obtain collation Fourier image data. The collation Fourier image data and the registration Fourier image data are then synthesized. Amplitude suppression processing is performed for the resultant synthesized Fourier image data, and two-dimensional discrete Fourier transform is performed for the resultant image data. Collation between the registration fingerprint and the collation fingerprint is performed on the basis of the intensities of the correlation components of the respective pixels in a correlation component area appearing in the synthesized Fourier image data having undergone this two-dimensional discrete Fourier transform.

In this embodiment, essentially, collation between a registration fingerprint and a collation fingerprint is performed while the registration fingerprint is fixed, and the collation fingerprint is rotated clockwise degree by degree from −90 degrees. In this case, if the registration fingerprint coincides with the collation fingerprint before the rotation angle reaches +90 degrees, i.e., it is determined in step 712 that the correlation value is larger than the threshold, collation between the registration fingerprint and the collation fingerprint is complete. In contrast to this, if the registration fingerprint does not coincide with the collation fingerprint after the rotation angle reaches +90 degrees, NO is obtained in step 712, and the control section 20-1 determines that the registration fingerprint does not coincide with the collation fingerprint (step 716), and displays corresponding information.

[Embodiment 4: Fourth Aspect]

In Embodiment 3, collation fingerprint image data rotated through m·a degrees with m=−90 to +90 are set as rotated collation fingerprint image data, and two-dimensional discrete Fourier transform is performed for this rotated collation fingerprint image data in units of patterns to obtain collation Fourier image data. The collation Fourier image data and the registration Fourier image data are then synthesized.

In contrast to this, in Embodiment 4, two-dimensional discrete Fourier transform is performed for collation fingerprint image data to generate collation Fourier image data, and the collation Fourier image data is rotated through m·a with m=−90 to +90 to obtain rotated collation Fourier image data. The rotated collation Fourier image data are then synthesized, in units of pattern, with registration Fourier image data.

Figure 13:
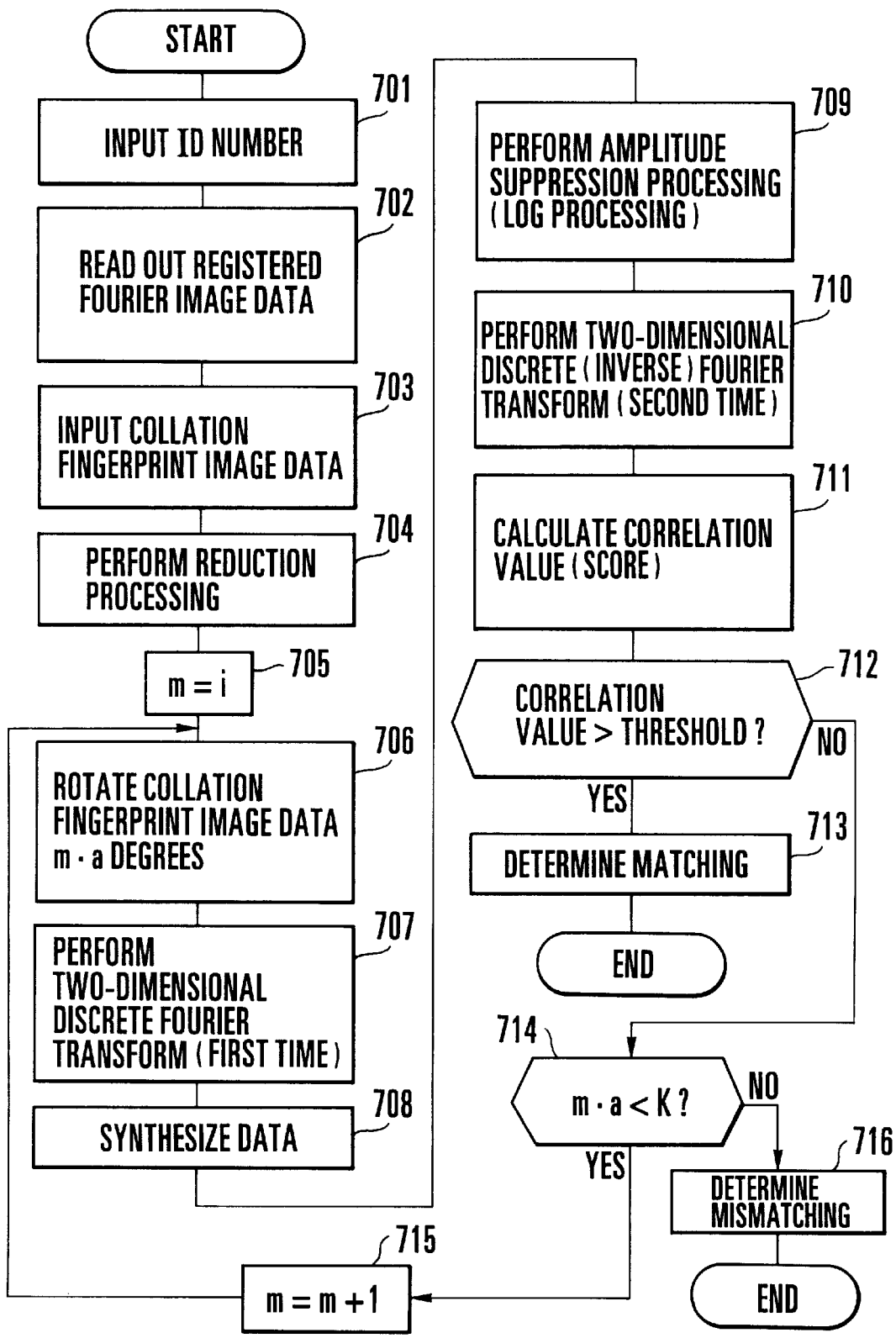
FIG. 13 is a flow chart for explaining a fingerprint collating operation in Embodiment 3.

More specifically, as shown in FIG. 14, the processing in steps 801, 802, 803, and 804 is performed in correspondence with steps 701, 702, 703, and 704 in FIG. 13, and two-dimensional discrete Fourier transform is performed for the collation fingerprint image data obtained in step 804 (step 805) to obtain collation Fourier image data. Thereafter, m=i (i=−90 in this case) is set (step 806), and the collation Fourier image data obtained in step 805 is rotated through m·a degrees (step 807). The collation Fourier image data rotated through m·a degrees is set as collation Fourier image data with m=i.

This collation Fourier image data is synthesized with the registration Fourier image data read out in step 802 (step 808), and amplitude suppression processing (log processing) is performed for the resultant synthesized Fourier image data (step 809). Second two-dimensional discrete Fourier transform is performed for the synthesized Fourier image data having undergone this amplitude suppression processing (step 810). Thereafter, the same "correlation value calculation" processing as that in step 711 is performed (step 811), and the correlation value obtained in step 811 is compared with a predetermined threshold (step 812). If the correlation value is larger than the threshold, it is determined that the registration fingerprint coincides with the collation fingerprint (step 813). If the correlation value is equal to or smaller than the threshold, it is checked whether m·a<K (a=1 and K=+90 in this case) (step 814). If m·a<K, m=m+1 is set (step 815), and the processing in step 807 and the subsequent steps is repeated.

With repetition of the processing in step 807 and the subsequent steps, the collation Fourier image data rotated through m·a degrees with m=−90 to +90 are set as rotated collation Fourier image data, and the rotated collation Fourier image data are synthesized, in units of patterns, with the registration Fourier image data. Amplitude suppression processing is performed for the resultant synthesized Fourier image data. Two-dimensional discrete Fourier transform is performed for the resultant image data. Collation between the registration fingerprint and the collation fingerprint is performed on the basis of the intensities of the correlation components of the respective pixels in a correlation component area appearing in the synthesized Fourier image data having undergone this two-dimensional discrete Fourier transform.

In Embodiment 4, since fingerprint registration processing is the same as that in Embodiment 3 (the flow chart of FIG. 12), a description thereof will be omitted. In this embodiment, as in Embodiment 3, essentially, collation between a registration fingerprint and a collation fingerprint is performed while the registration fingerprint is fixed, and the collation fingerprint is rotated clockwise degree by degree from −90 degrees.

As is apparent, Embodiments 2, 3, and 4 can be variously modified as in the case of Embodiment 1. More specifically, in Embodiments 3 and 4, two-dimensional discrete Fourier transform is performed in steps 710 and 810 in FIGS. 13 and 14. However, two-dimensional discrete inverse Fourier transform may be performed. In addition, amplitude suppression processing may be performed first for a registration fingerprint and a collation fingerprint, and then the resultant data may be synthesized. Furthermore, amplitude suppression processing need not always be performed.

[Embodiment 5]

In Embodiments 1 to 4, even if a rotation offset occurs between a registration fingerprint and a collation fingerprint, the registration fingerprint and the collation fingerprint can be identified as identical fingerprints or not. Essentially, therefore, collation between a registration fingerprint and a collation fingerprint is performed while the registration fingerprint (collation fingerprint) is fixed, and the collation fingerprint (registration fingerprint) is rotated.

According to this method, however, since the amount of rotation offset between a registration fingerprint and a collation fingerprint cannot be known, many rotated patterns must be generated. In addition, each of the generated rotated patterns must be sequentially collated with the fixed pattern. For this reason, the load of collation processing is heavy, and it takes much time to obtain the final collation result.

In Embodiment 5, therefore, two-dimensional discrete Fourier transform is performed for registration fingerprint image data R to generate registration Fourier image data $R_F$, and two-dimensional discrete Fourier transform is performed for collation fingerprint image data I to generate collation Fourier image data $I_F$. The coordinate system of the registration Fourier image data $R_F$ and the collation Fourier image data $I_F$ is converted into a polar coordinate system. Resultant registration Fourier image data $R_P$ and collation Fourier image data $I_P$ in this polar coordinate system are then collated (coarse collation) by an amplitude suppression correlation method. A rotation offset amount Δθ between these images is obtained from the positions of the correlation peaks obtained in this collation process. Rotation offset correction is performed for one of the registration fingerprint and the collation fingerprint on the basis of the obtained rotation offset amount Δθ, and the registration fingerprint and the collation fingerprint are collated again (fine collation) by the amplitude suppression correlation method. When collation is performed by this method, the load of collation processing can be reduced, and the time required to obtain the final collation result can be shortened.

The fingerprint collating operation of Embodiment 5 will be described in detail below with reference to the flow chart of FIG. 15.

[Registration of Fingerprint]

Figure 15:
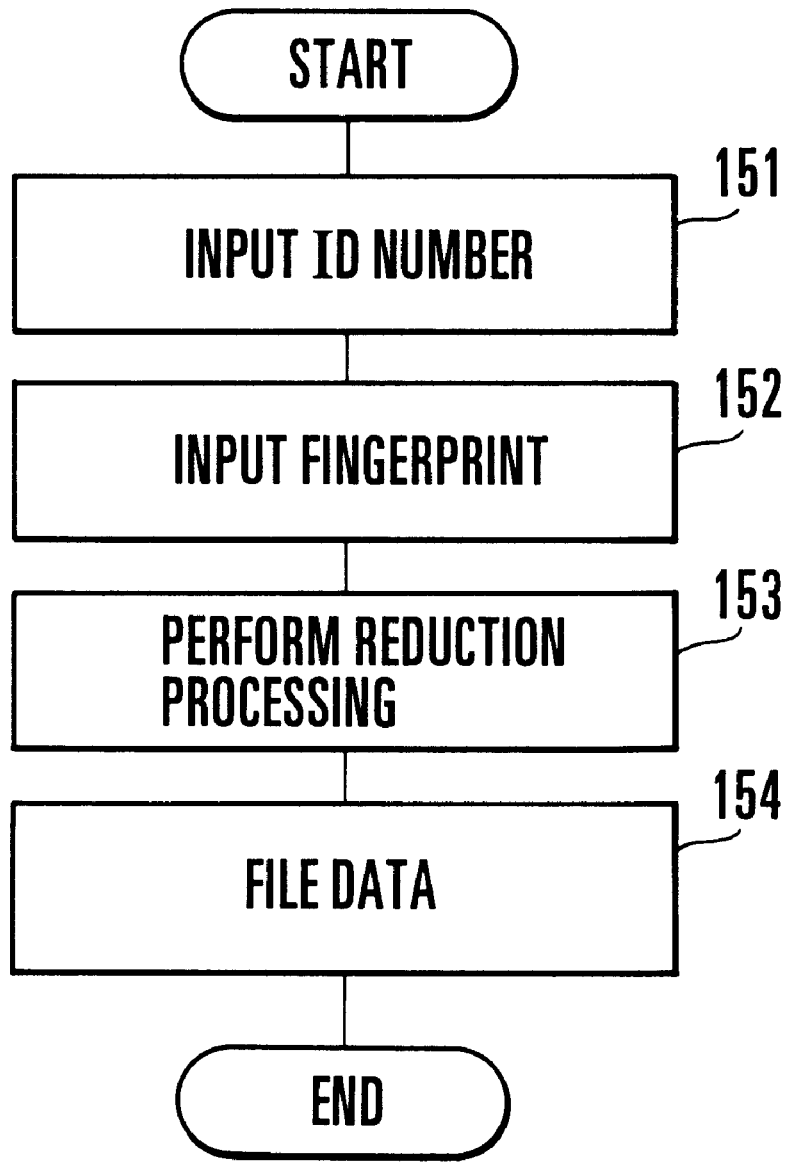
FIG. 15 is a flow chart for explaining a fingerprint registering operation in Embodiment 5.

In Embodiment 5, as indicated by the flow chart of FIG. 15, the processing in steps 151, 152, and 153 is performed in correspondence with steps 601, 602, and 603 in FIG. 12, and the registration fingerprint image data R obtained in step 153 is filed as the original image data of the registration fingerprint in correspondence with the ID number (step 154). As in the case of the flow chart of FIG. 12, two-dimensional discrete Fourier transform may be performed for the registration fingerprint image data R to generate the registration Fourier image data $R_F$, and the registration Fourier image data $R_F$ may be filed as the original image data of the registration fingerprint in correspondence with the ID number.

[Collation of Fingerprints (amplitude components without change+phase components)]

Collation of fingerprints is performed in the following manner. When an ID number is input (step 161 in FIG. 16), the registration fingerprint image data R filed in correspondence with the ID number is read out (step 162; see FIG. 17A). A collation fingerprint is input (step 163), and reduction processing is performed for the collation fingerprint (step 164) to obtain the collation fingerprint image data I (see FIG. 17B). Thereafter, two-dimensional discrete Fourier transform is performed for the registration fingerprint image data R read out in step 162 to generate the registration Fourier image data $R_F$ (step 165; see FIG. 17C), and two-dimensional discrete Fourier transform is performed for the collation fingerprint image data I obtained in step 164 to generate the collation Fourier image data $I_F$ (step 166; see FIG. 17D).

The registration Fourier image data $R_F$ and the collation Fourier image data $I_F$ contain amplitude and phase components. In addition, the registration Fourier image data $R_F$ and the collation Fourier image data $I_F$ are data in the Cartesian coordinate system, i.e., the (x, y) coordinate system.

The coordinate system of the registration Fourier image data $R_F$ obtained in step 165 is converted into the polar coordinate system (step 167) to obtain the registration Fourier image data $R_P$ in the polar coordinate system (see FIG. 17E). In addition, the coordinate system of the collation Fourier image data $I_F$ obtained in step 166 is converted into the polar coordinate system (step 168) to obtain the collation Fourier image data $I_P$ in the polar coordinate system (see FIG. 17F). In this case, the polar coordinate conversion is conversion from the Cartesian coordinate system (x, y) to the polar coordinate system (r, θ). That is, the polar coordinate conversion is conversion from the Cartesian coordinate system (x=rcosθ, y=rsinθ) in FIG. 18A to the polar coordinate system $(r=(x^2+y^2)^{1/2}, \theta=\tan^{-1}(y/x))$ in FIG. 18B.

Figure 19:
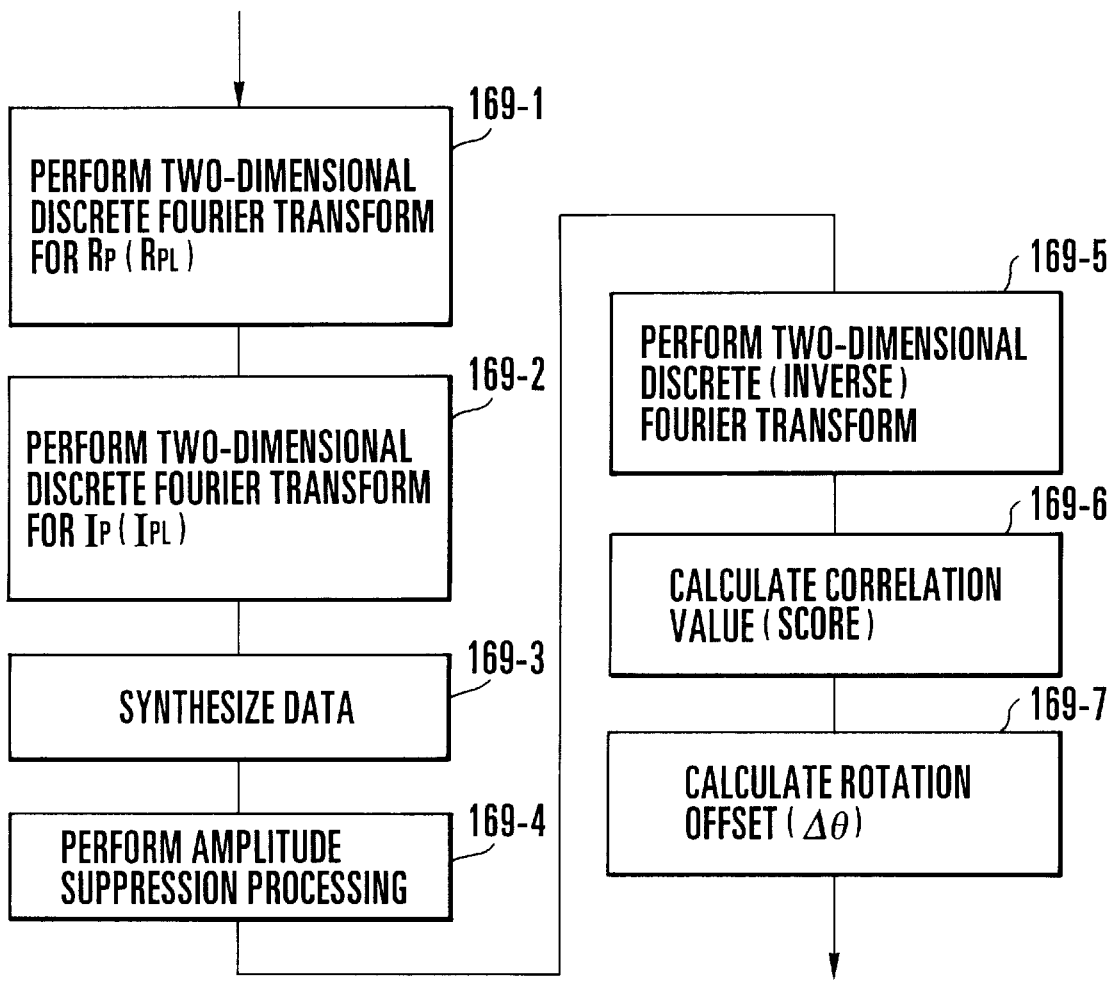
FIG. 19 is a flow chart showing the processing contents in step 169 in FIG. 16.

The registration Fourier image data $R_P$ in the polar coordinate system, obtained in step 167, is collated with the collation Fourier image data $I_P$ in the polar coordinate system, obtained in step 168, by the amplitude suppression correlation method (step 169). FIG. 19 shows the collation process.

Figure 20:
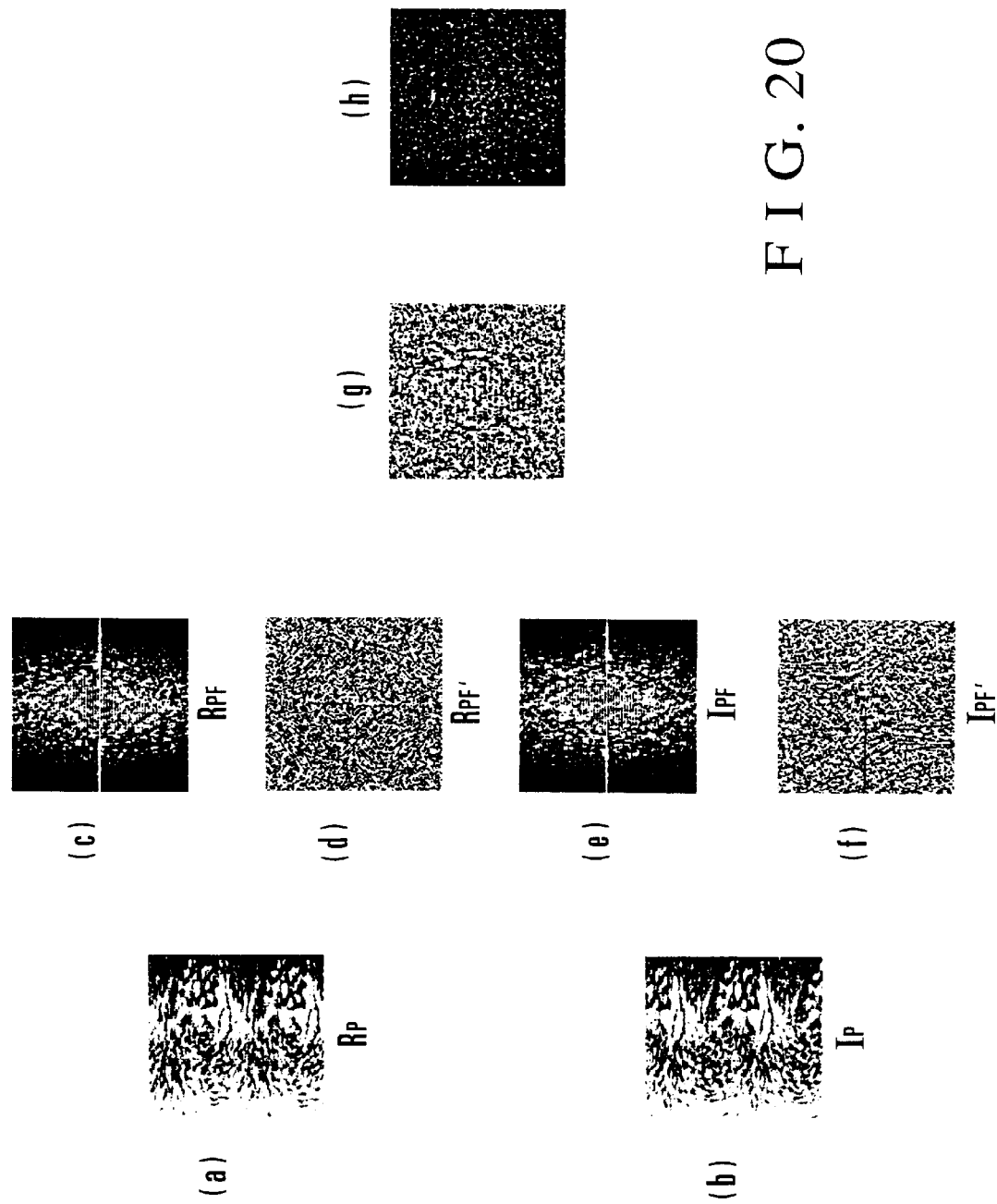
FIGS. 20A to 20H are views for explaining processing to be performed after polar coordinate conversion is performed in a coarse collation process.

In this case, two-dimensional discrete Fourier transform is performed for the registration Fourier image data $R_P$ in the polar coordinate system (see FIG. 20A) and the collation Fourier image data $I_P$ in the polar coordinate system (see FIG. 20B) (steps 169-1 and 169-2) to obtain registration Fourier image data $R_{PF}$ (see FIG. 20C) and collation Fourier image data $I_{PF}$ (see FIG. 20E).

The registration Fourier image data $R_{PF}$ and the collation Fourier image data $I_{PF}$ are synthesized (step 169-3) to obtain synthesized Fourier image data. Amplitude suppression processing is performed for this synthesized Fourier image data (step 169-4; see FIG. 20G), and two-dimensional discrete Fourier transform is performed for the synthesized Fourier image data having undergone this amplitude suppression processing (step 169-5; see FIGS. 20H and 17G (FIG. 20H=FIG. 17G)).

In this embodiment, amplitude suppression processing is performed for the synthesized Fourier image data obtained by synthesizing the data $R_{PF}$ and $I_{PF}$. However, amplitude suppression processing may be performed for the data $R_{PF}$ and $I_{PF}$ to obtain registration Fourier image data $R_{PF}'$ and collation Fourier image data $I_{PF}'$ (see FIGS. 20D and 20F), and the data $R_{PF}'$ and $I_{PF}'$ may be synthesized. In the data shown in FIGS. 20D, 20F, and 20G, all the amplitudes are set to 1 by amplitude suppression processing, i.e., only phase components are left.

Subsequently, the intensities (amplitudes) of the correlation components of the respective pixels in a predetermined correlation component area of the synthesized Fourier image data having undergone this two-dimensional discrete Fourier transform are scanned to obtain the histogram of the intensities of the correlation components of the respective pixels. N pixels having higher correlation component intensities are extracted from this histogram, and the average of the correlation component intensities of the extracted n pixels is obtained as a correlation value (score) (step 169-6). In this case, if the obtained correlation value is large, it can be determined that the registration fingerprint coincides with the collation fingerprint (coarse collation), although this determination is based on coarse collation. In Embodiment 5, however, the collation result obtained by this coarse collation is not used.

The pixel having the highest correlation component intensity is obtained as the correlation peak from the synthesized Fourier image data having undergone the previous two-dimensional discrete Fourier transform, and a rotation offset amount $\Delta\theta$ between the registration fingerprint and the collation fingerprint, i.e., the rotation offset amount $\Delta\theta$ between the registration fingerprint image data R and the collation fingerprint image data I, is obtained from the position of the correlation peak (step 169-7).

Referring to FIG. 17G, a correlation peak P1 appears. The rotation offset amount $\Delta\theta$ is obtained from the positional relationship between this correlation peak P1 and the center of the correlation area. That is, the rotation offset amount $\Delta\theta$ is obtained from the position of the correlation peak P1 in the area in the vertical direction. In this case, the upper and lower limit positions in the area in the vertical direction are $\Delta\theta=+180°$ and $\Delta\theta=-180°$, respectively.

Figure 21:
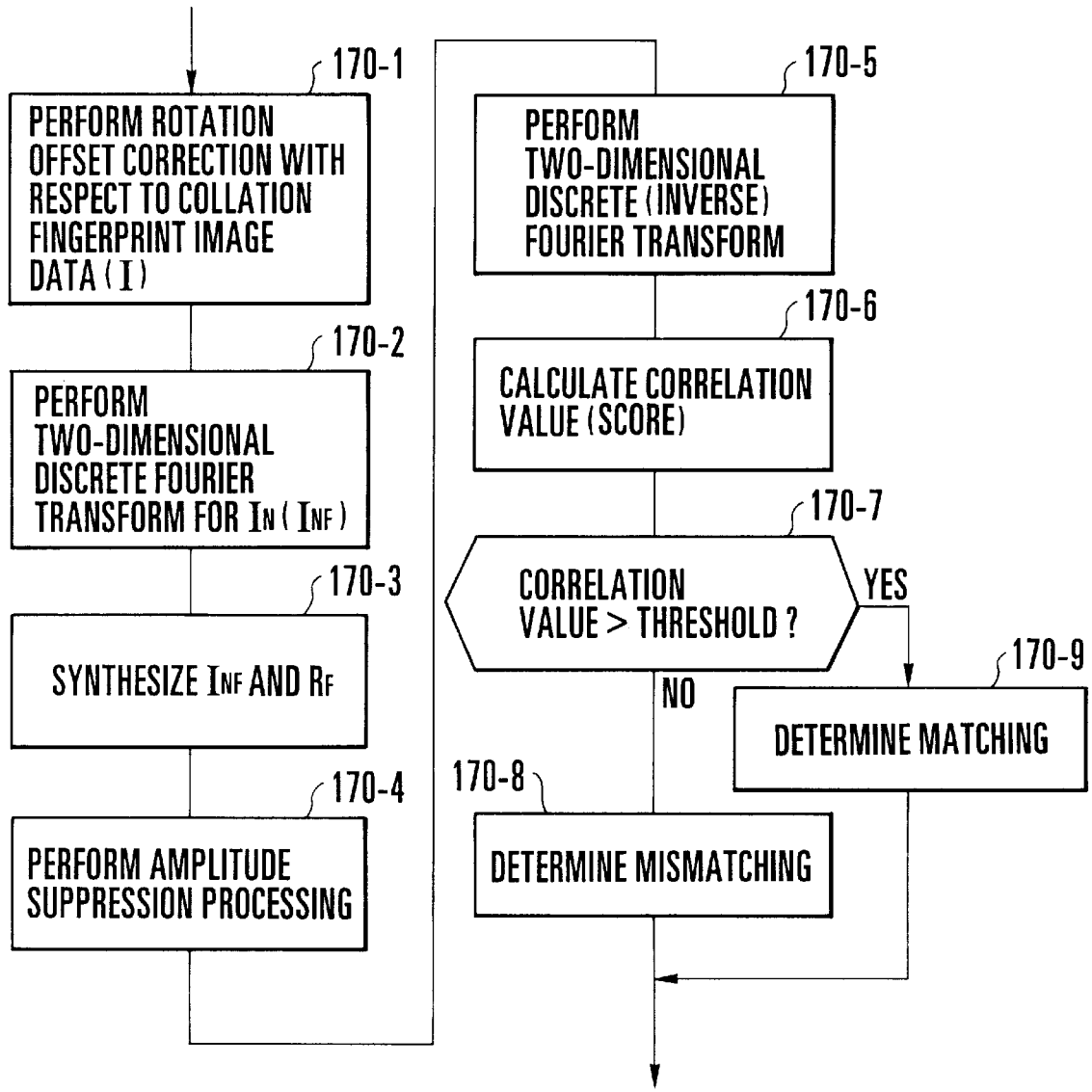
FIG. 21 is a flow chart showing the processing contents in step 170 in FIG. 16.

After the rotation offset amount $\Delta\theta$ between the registration fingerprint image data R and the collation fingerprint image data I is obtained, the rotation offset of the collation fingerprint image data I is corrected on the basis of the obtained rotation offset amount $\Delta\theta$. The registration fingerprint and the collation fingerprint are collated again by the amplitude suppression correlation method (step 170). FIG. 21 shows this re-collation process.

Figure 22:
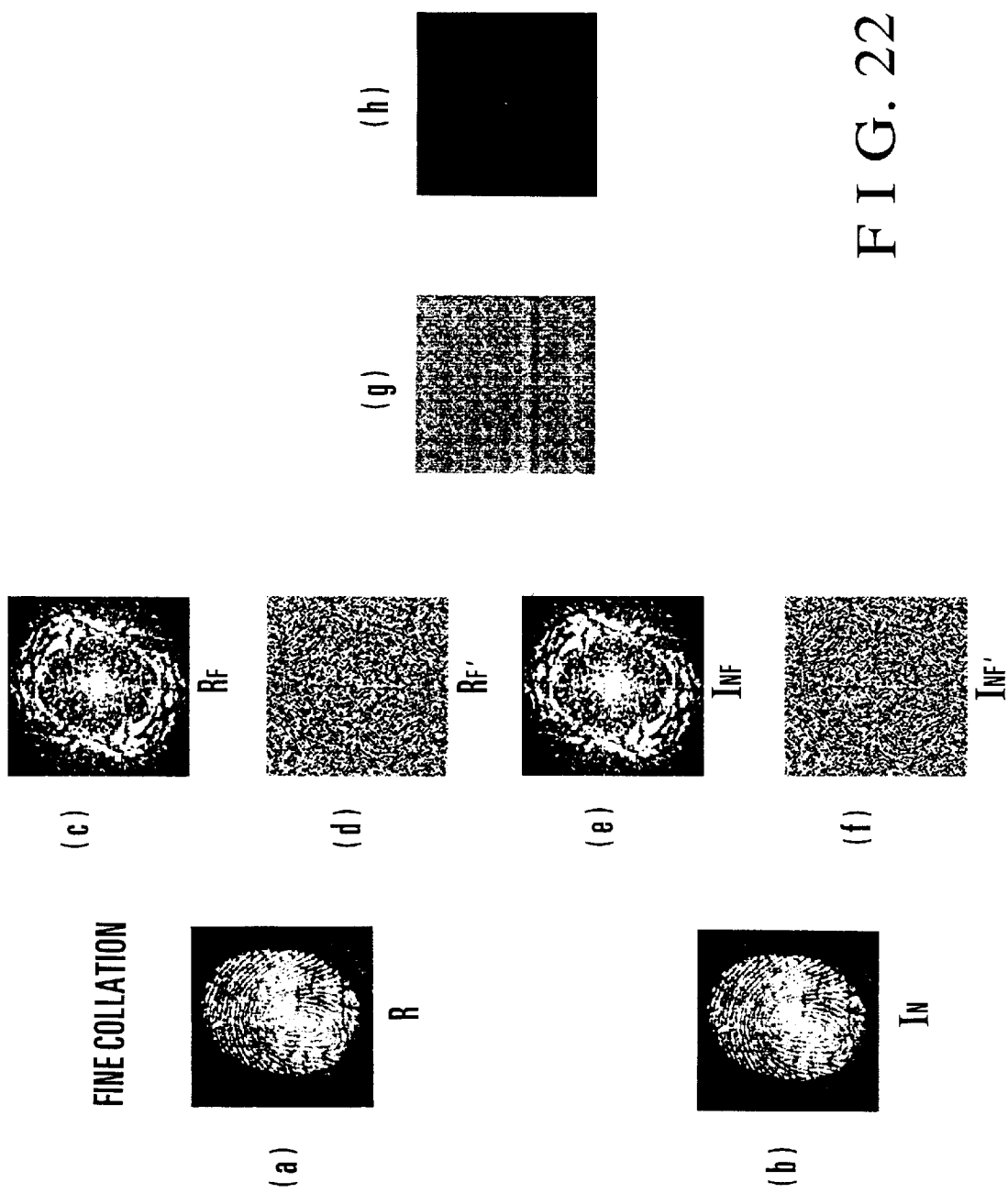
FIGS. 22A to 22H are views for explaining a fine collation process in Embodiment 5.

In this case, the rotation offset amount $\Delta\theta$ is corrected with respect to the collation fingerprint image data I (step 171-1) to obtain image data $I_N$ whose rotation angle is made to coincide with that of the registration fingerprint image data R (see FIGS. 22A and 22B). Thereafter, two-dimensional discrete Fourier transform is performed for the collation fingerprint image data $I_N$ (step 170-2) to obtain collation Fourier image data $I_{NF}$ (see FIG. 22E).

This collation Fourier image data $I_{NF}$ is synthesized with the registration Fourier image data $R_F$ previously obtained in step 165 (see FIG. 22C) (step 170-3) to obtain synthesized Fourier image data. Amplitude suppression processing is performed for this synthesized Fourier image data (step 170-4), and two-dimensional discrete Fourier transform is performed for the synthesized Fourier image data (see FIG. 22G) having undergone this amplitude suppression processing (step 170-5).

The intensities (amplitudes) of the correlation components of the respective pixels in a predetermined correlation component area of the synthesized Fourier image data (see FIG. 22H) having undergone this two-dimensional discrete Fourier transform are scanned to obtain the histogram of the intensities of the correlation components of the respective pixels. N pixels having higher correlation component intensities are extracted from this histogram, and the average of the correlation component intensities of the n pixels is obtained as a correlation value (score) (step 170-6).

The correlation value obtained in step 170-6 is compared with a predetermined threshold (step 170-7). If the correlation value is larger than the threshold, it is determined that the registration fingerprint coincides with the collation fingerprint (step 170-8). If the correlation value is equal to or smaller than the threshold, it is determined that the registration fingerprint does not coincide with the collation fingerprint (step 170-9). With this processing, fine collation between the registration fingerprint and the collation fingerprint is performed.

In this embodiment, amplitude suppression processing is performed for the synthesized Fourier image data obtained by synthesizing the data $R_F$ and $I_{NF}$. However, amplitude suppression processing may be performed for the data $R_F$ and $I_{NF}$ to obtain registration Fourier image data $R_F'$ and collation Fourier image data $I_{NF}'$ (see FIGS. 22D and 22F), and these data $R_F'$ and $I_{NF}'$ may be synthesized. In the data shown in FIGS. 22D, 22F, and 22G, all the amplitudes are set to 1 by amplitude suppression processing, i.e., only phase components are left.

According to the flow chart of FIG. 21, after rotation offset correction is performed for the collation fingerprint image data I, the registration fingerprint and the collation fingerprint are collated again. However, after rotation offset correction may be performed for the registration fingerprint image data R, the registration fingerprint and the collation fingerprint may be collated again.

[Embodiment 6-1; Ninth Aspect (amplitude suppression+phase components)]

In Embodiment 5, in coarse collation, the coordinate system of the registration Fourier image data $R_F$ and the collation Fourier image data $I_F$, each containing amplitude components (no change in amplitude) and phase components, is converted into the polar coordinate system (steps 165 to 168 in FIG. 16).

In contrast to this, in Embodiment 6-1, amplitude suppression processing is performed for registration Fourier image data $R_F$ and collation Fourier image data $I_F$, and the coordinate system of registration Fourier image data $R_{FL}$ and collation Fourier image data $I_{FL}$ having undergone this amplitude suppression processing is converted into the polar coordinate system. The flow chart of FIG. 23 shows this process.

As is obvious from comparison with the flow chart of FIG. 16, in this embodiment, steps 171 and 172 are added to perform amplitude suppression processing for the registration Fourier image data $R_F$ and the collation Fourier image data $I_F$ (steps 171 and 172), and the coordinate system of the registration Fourier image data $R_{FL}$ and the collation Fourier image data $I_{FL}$ having undergone this amplitude suppression processing is converted into the polar coordinate system to obtain data $R_{PL}$ and $I_{PL}$ (steps 167 and 168).

According to Embodiment 6-1, by performing amplitude suppression processing for the registration Fourier image data $R_F$ and the collation Fourier image data $I_F$, collation is made less susceptible to changes in illuminance. High-precision collation can therefore be performed regardless of the difference in illuminance between registration processing and collation processing.

In Embodiment 6-1, amplitude suppression processing is performed for the registration Fourier image data $R_F$ and the collation Fourier image data $I_F$, and the coordinate system of the registration Fourier image data $R_{FL}$ and the collation Fourier image data $I_{FL}$ having undergone this amplitude suppression processing is converted into the polar coordinate system. However, after the coordinate system of the registration Fourier image data $R_F$ and the collation Fourier image data $I_F$ is converted into the polar coordinate system, amplitude suppression processing may be performed for the resultant registration Fourier image data $R_P$ and the resultant collation Fourier image data $I_P$ to obtain the data $R_{PL}$ and $I_{PL}$.

[Embodiment 6-2; 11th Aspect (amplitude suppression+ addition of phase signs (±) to amplitudes)]

In Embodiment 6-1, in coarse collation, the coordinate system of the registration Fourier image data $R_{FL}$ and the collation Fourier image data $I_{FL}$, each containing amplitude components having undergone amplitude suppression and phase components, is converted into the polar coordinate system (steps 167 and 168 in FIG. 23).

Figure 24:
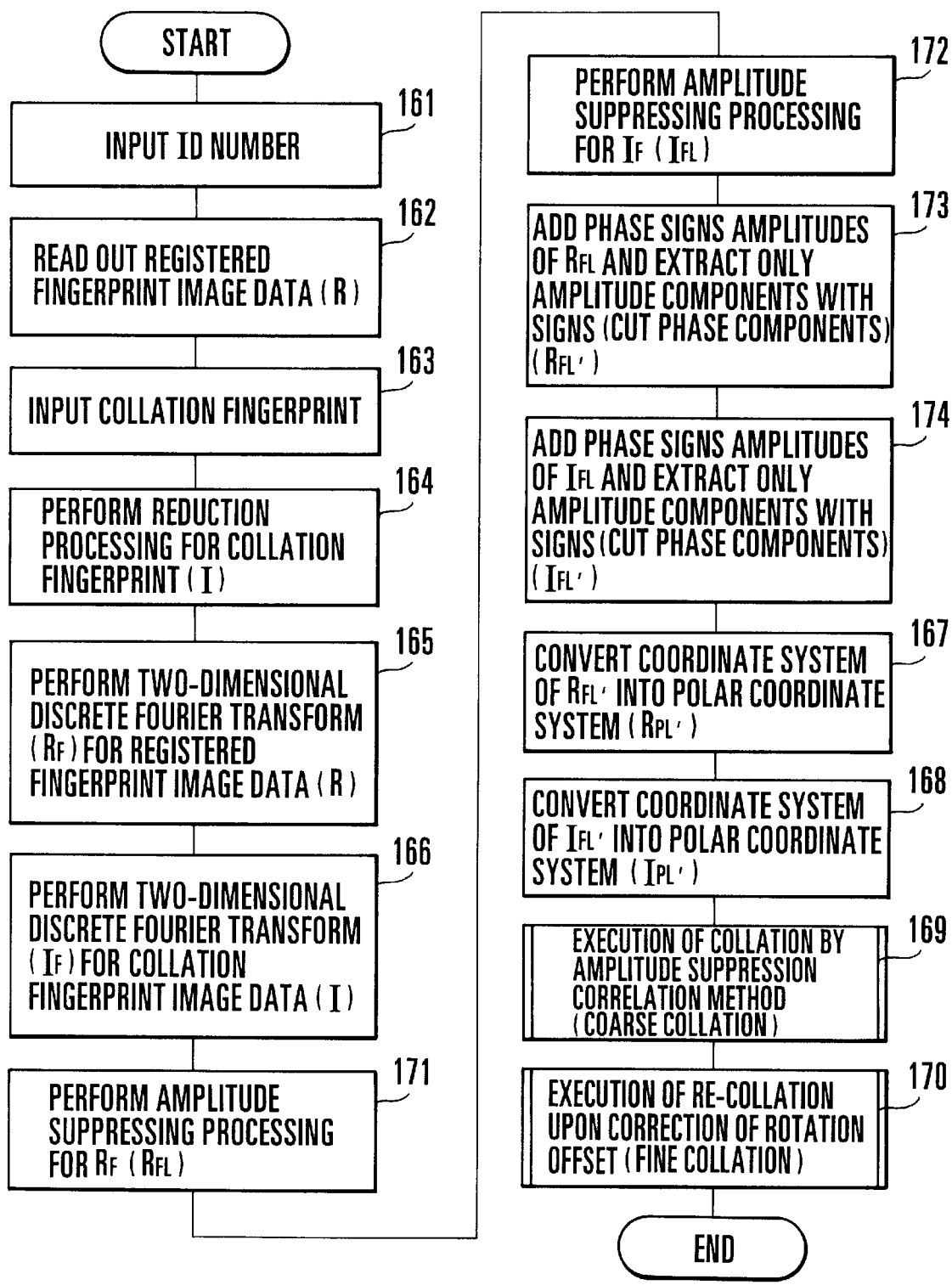
FIG. 24 is a flow chart for explaining a fingerprint collating operation in Embodiment 6-2.

In contrast to this, in Embodiment 6-2, phase signs are added to amplitudes of registration Fourier image data $R_{FL}$ and collation Fourier image data $I_{FL}$ having undergone amplitude suppression processing, and only the amplitude components with the signs ($R_{FL}'$, $I_{FL}'$) are extracted. The coordinate system of the amplitude components $R_{FL}'$ and $I_{FL}'$ is converted into the polar coordinate system. The flow chart of FIG. 24 shows this process.

As is obvious from comparison with the flow chart of FIG. 23, in this embodiment, steps 173 and 174 are added to add phase signs to amplitudes of the registration Fourier image data $R_{FL}$ and the collation Fourier image data $I_{FL}$ having undergone amplitude suppression processing, only the amplitude components with the signs ($R_{FL}'$, $I_{FL}'$) are extracted, and the coordinate system of the extracted amplitude components is converted into the polar coordinate system to obtain data $R_{PL}'$ and $I_{PL}'$ (steps 167 and 168).

According to Embodiment 6-2, phase signs are added to amplitudes of the registration Fourier image data $R_F$ and the collation Fourier image data $I_F$, and only the amplitude components with the signs are extracted. With this processing, collation is made less susceptible to an error due to phase discontinuity, and hence high-precision collation can be performed regardless of an error such as a position offset between registration processing and collation processing.

In Embodiment 6-1, amplitude suppression processing is performed for the registration Fourier image data $R_F$ and the collation Fourier image data $I_F$, and phase signs are added to amplitudes of the registration Fourier image data $R_{FL}$ and the collation Fourier image data $I_{FL}$ having undergone this amplitude suppression processing. After only the amplitude components with the signs are extracted, the coordinate system of the extracted amplitude components is converted into the polar coordinate system. However, after the coordinate system of the registration Fourier image data $R_F$ and the collation Fourier image data $I_F$ is converted into the polar coordinate system, amplitude suppression processing may be performed for the resultant registration Fourier image data $R_P$ and the resultant collation Fourier image data $I_P$. Thereafter, phase signs may be added to amplitudes of the respective data, and only the amplitude components with the signs may be extracted to obtain the data $R_{PL}'$ and $I_{PL}'$. In Embodiment 6-2, however, the intensities of the correlation components of the respective pixels in a correlation component area are not scanned as amplitudes but are scanned as the real parts of complex numbers to obtain a correlation value (score).

[Embodiment 7: 12th Aspect (amplitude suppression+no phase components)]

In Embodiment 6-1, amplitude suppression processing is performed for the registration Fourier image data $R_F$ and the collation Fourier image data $I_F$, and the coordinate system of the registration Fourier image data $R_{FL}$ and the collation Fourier image data $I_{FL}$ having undergone this amplitude suppression processing is converted into the polar coordinate system.

In contrast to this, in Embodiment 7, phase components are removed from registration Fourier image data $R_F$ and collation Fourier image data $I_F$, and amplitude suppression processing is performed for registration Fourier image data $R_F'$ and collation Fourier image data $I_F'$, from which the phase components are removed. The coordinate system of registration Fourier image data $R_{FL}'$ and collation Fourier image data $I_{FL}'$ having undergone this amplitude suppression processing is converted into the polar coordinate system. In this amplitude suppression processing, log processing or root processing is performed instead of performing amplitude suppression processing of setting all the amplitudes to 1. The flow chart of FIG. 25 shows this process.

As is obvious from comparison with the flow chart of FIG. 16, in this embodiment, steps 175, 176, 177, and 178 are added to extract only the amplitude components (cut the phase components) from the registration Fourier image data $R_F$ and the collation Fourier image data $I_F$ (steps 175 and 176) and perform amplitude suppression processing for the registration Fourier image data $R_F'$ and the collation Fourier image data $I_F'$, from which the phase components are removed (steps 177 and 178). The coordinate system of the registration Fourier image data $R_{FL}'$ and the collation Fourier image data $I_{FL}'$ having undergone this amplitude suppression processing is then converted into the polar coordinate system to obtain the data $R_{PL}'$ and $I_{PL}'$ (steps 167 and 168).

According to Embodiment 7, after the phase components are removed from the registration Fourier image data $R_F$ and the collation Fourier image data $I_F$, amplitude suppression processing is performed for the resultant data. With this processing, collation is made less susceptible to a change in illuminance, and hence high-precision collation can be performed regardless of the difference in illuminance between registration processing and collation processing. In addition, the performance in obtaining a correlation peak by the amplitude suppression correlation method after polar coordinate conversion improves. That is, phases exhibit poor continuity among the respective pixels, whereas amplitudes exhibit good continuity among the respective pixels. By removing the phase components, therefore, the performance in obtaining a correlation peak by the amplitude suppression correlation method after polar coordinate conversion improves.

In this case, however, as shown in FIG. 26G, correlation peaks P1 and P2 appear in the correlation component area. This phenomenon occurs because the amplitude spectrum is point-symmetrical. Mask processing is performed to determine one of these correlation peaks P1 and P2 as a normal correlation peak indicating a rotation offset amount Δθ including a rotational direction. The rotation offset amount Δθ is obtained from this determined correlation peak. If, for example, the correlation peak P1 is determined as the normal correlation peak, the rotation offset amount Δθ is obtained from the position of the correlation peak P1 in the area in FIG. 26G in the vertical direction. In this case, the upper and lower limit positions in the area in the vertical direction are Δθ=+180° and Δθ=−180°, respectively.

In this embodiment, after the phase components are removed from the registration Fourier image data $R_F$ and the collation Fourier image data $I_F$, amplitude suppression processing is performed for the resultant data, and the coordinate system of the registration Fourier image data $R_{FL}'$ and the collation Fourier image data $I_{FL}'$ having undergone this amplitude suppression processing is converted into the polar coordinate system. However, after the coordinate system of the registration Fourier image data $R_F'$ and the collation Fourier image data $I_F'$, from which the phase components are removed, is converted into the polar coordinate system, amplitude suppression processing may be performed for registration Fourier image data $R_P'$ and collation Fourier image data $I_P'$ in the polar coordinate system to obtain data $R_{PL}'$ and $I_{PL}'$.

[Embodiment 8: (amplitude components without change+no phase components)]

In Embodiment 7, after the phase components are removed from the registration Fourier image data $R_F$ and the collation Fourier image data $I_F$, amplitude suppression processing is performed for the resultant data, and the coordinate system of the registration Fourier image data $R_{FL}'$ and the collation Fourier image data $I_{FL}'$ having undergone this amplitude suppression processing is converted into the polar coordinate system.

Figure 27:
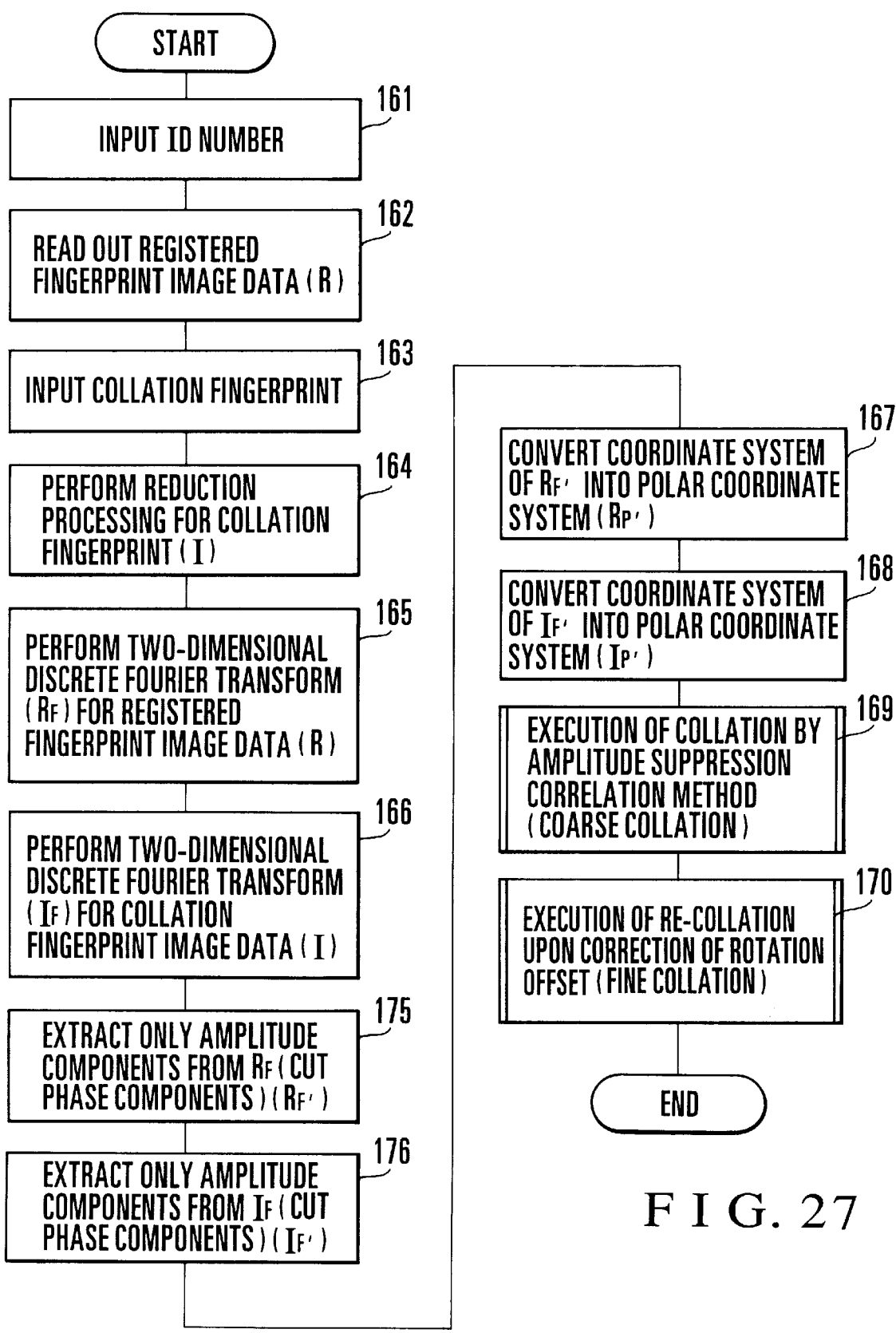
FIG. 27 is a flow chart for explaining a fingerprint collating operation in Embodiment 8.

In contrast to this, in Embodiment 8, phase components are removed from registration Fourier image data $R_F$ and collation Fourier image data $I_F$, and the coordinate system of registration Fourier image data $R_F'$ and collation Fourier image data $I_F'$, from which the phase components are removed, i.e., the registration Fourier image data $R_F'$ and the collation Fourier image data $I_F'$, from which only the phase components are removed while the amplitude components are left, is converted into the polar coordinate system. The flow chart of FIG. 27 shows this process.

As is obvious from comparison with the flow chart of FIG. 16, in this embodiment, steps 175 and 176 are added to extract only the amplitude components (cut the phase components) from the registration Fourier image data $R_F$ and the collation Fourier image data $I_F$, and the coordinate system of the registration Fourier image data $R_F'$ and the collation Fourier image data $I_F'$, from which the phase components are removed, is converted into the polar coordinate system to obtain data $R_P'$ and $I_P'$ (steps 167 and 168).

According to Embodiment 8, by removing phase components from registration Fourier image data ($R_F$) and collation Fourier image data ($I_F$), the performance in obtaining a correlation peak by the amplitude suppression correlation method after polar coordinate conversion improves, similar to Embodiment 7.

[Embodiment 9: 13th Aspect]

In Embodiments 5 to 8, the flow advances to step 170 immediately after step 169. That is, the flow advances to the fine collation step without using the collation result obtained by coarse collation. However, the flow may advance to the fine collation step only when the result obtained in the coarse collation step indicates incoincidence between a registration fingerprint and a collation fingerprint.

Figure 28:
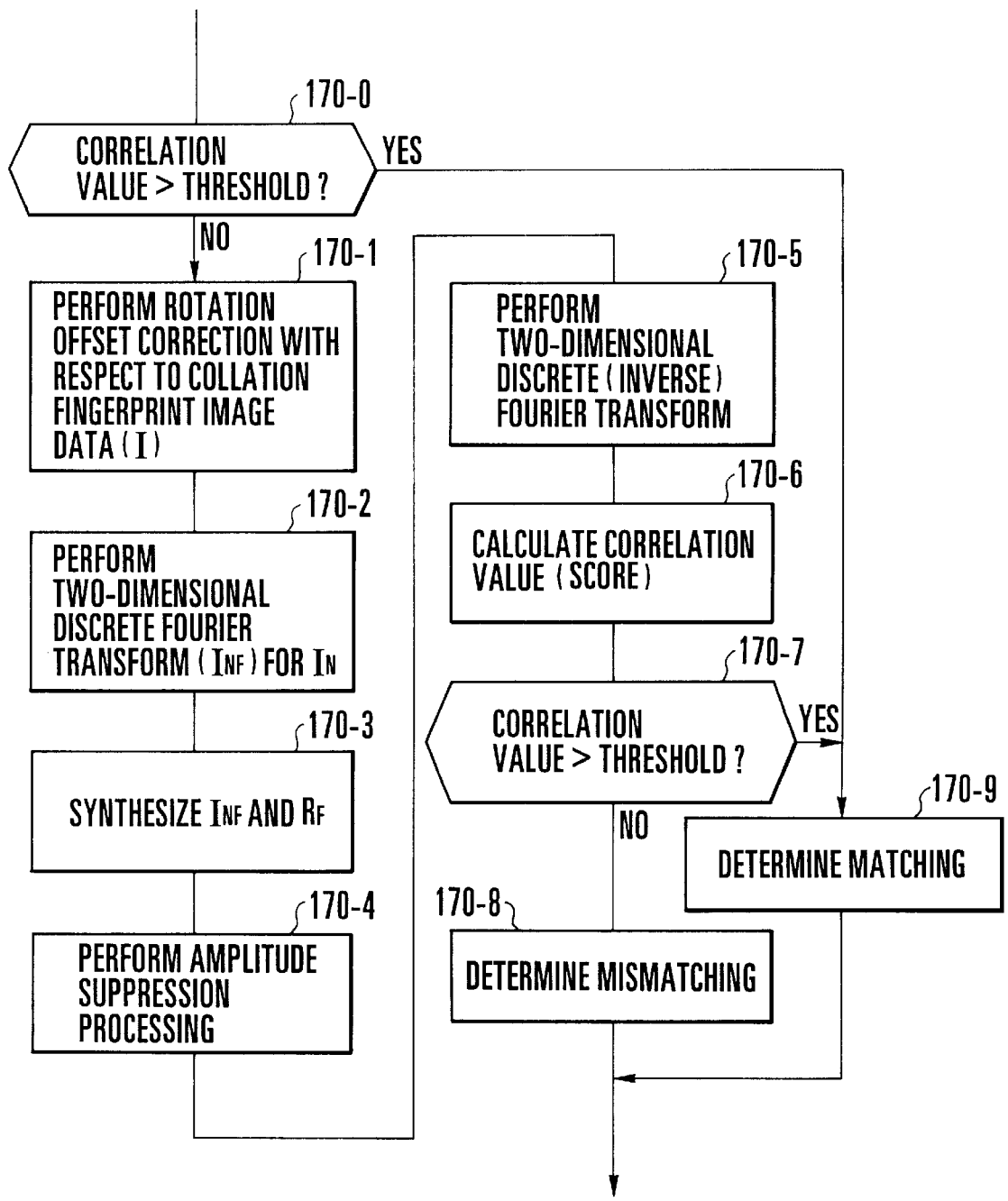
FIG. 28 is a flow chart for explaining Embodiment 9.

More specifically, step 170 in FIGS. 16, 23, 24, 25, and 27 may be replaced with the processing shown in FIG. 28. In this case, the correlation value obtained by coarse collation is compared with a predetermined threshold (step 170-0). If the correlation value is larger than the threshold, it is immediately determined that the registration fingerprint and the collation fingerprint coincide with each other (step 170-9). In contrast to this, if the correlation value is equal to or smaller than the threshold, it is determined that the collation result obtained by coarse collation indicates "incoincidence", and the flow advances to the fine collation processing in step 170-1 and the subsequent steps.

According to Embodiment 9, if "coincidence" is determined in coarse collation processing, the collation result is immediately obtained. With this operation, the collation speed increases when a registration fingerprint coincides with a collation fingerprint. In addition, according to Embodiment 9, when "incoincidence" is determined in coarse collation processing, the flow advances to fine collation processing without outputting the collation result. With this operation, coarse collation processing and fine collation processing combine to increase the collation precision.

As is obvious from the above description, according to the first, second, fifth, and sixth aspects of the present invention, collation between a registration fingerprint and a collation fingerprint is essentially performed while the collation fingerprint is fixed, and the registration fingerprint is rotated. In addition, according to the third, fourth, seventh, and eighth aspects of the present invention, collation between a registration fingerprint and a collation fingerprint is essentially performed while the registration fingerprint is fixed, and the collation fingerprint is rotated. Even if, therefore, a rotation offset occurs between a registration pattern and a collation pattern, the registration pattern and the collation pattern can be identified as identical patterns or not.

According to the 9th to 13th aspects of the present invention, the rotation offset amount Δθ between a registration fingerprint and a collation fingerprint is obtained from the position of the correlation peak obtained in the coarse collation process, and rotation offset correction is performed for one of the registration fingerprint and the collation fingerprint on the basis of the obtained rotation offset amount Δθ. Thereafter, the registration fingerprint and the collation fingerprint are collated again (fine collation) by the amplitude suppression correlation method, thereby reducing the load of collation processing and shortening the time required to obtain the collation result.

According to the 14th aspect of the present invention, if the correlation peak obtained in the coarse collation process is larger than a predetermined threshold, the collation result can be immediately obtained, thereby increasing the collation speed when the registration fingerprint coincides with the collation pattern. If the correlation peak obtained in the coarse collation process is equal to or smaller than the predetermined threshold, the rotation offset amount (Δθ) between the two patterns is obtained from the position of the correlation peak, and rotation offset correction is performed for one of the registration pattern and the collation pattern on the basis of the obtained rotation offset amount (Δθ). Thereafter, the registration pattern and the collation pattern are collated again (fine collation) by the amplitude suppression correlation method. As a result, the coarse collation processing and the fine collation processing combine to improve the collation precision.

What is claimed is:

1. A pattern collation apparatus comprising:

registration Fourier pattern data generating means for generating registration Fourier N-dimensional pattern data by performing N-dimensional discrete Fourier transform for N-dimensional pattern data of a registration pattern and a plurality of N-dimensional pattern data obtained by rotating the N-dimensional pattern data of the registration pattern through predetermined different angles;

collation Fourier pattern data generating means for generating collation Fourier N-dimensional pattern data by performing N-dimensional discrete Fourier transform for N-dimensional pattern data of a collation pattern; and pattern collation means for reading out the registration Fourier N-dimensional pattern data in units of patterns, synthesizing the readout registration Fourier N-dimensional pattern data with the collation Fourier N-dimensional pattern data, performing either N-dimensional discrete Fourier transform or N-dimensional discrete inverse Fourier transform for the resultant synthesized Fourier N-dimensional pattern data after performing amplitude suppression processing therefor, and performing collation between the registration pattern and the collation pattern on the basis of intensities of correlation components of the respective data constituting N-dimensional pattern data of a correlation component area appearing in the synthesized Fourier transformed N-dimensional pattern data.

2. A pattern collation apparatus comprising:

registration Fourier N-dimensional pattern data generating means for generating registration Fourier N-dimensional pattern data by performing N-dimensional discrete Fourier transform for N-dimensional pattern data of a registration pattern, and setting the registration Fourier N-dimensional pattern data and a plurality of registration Fourier N-dimensional pattern data obtained by rotating the registration Fourier N-dimensional pattern data through predetermined different angles;

collation Fourier pattern data generating means for generating collation Fourier N-dimensional pattern data by performing N-dimensional discrete Fourier transform for N-dimensional pattern data of a collation pattern; and pattern collation means for reading out registration Fourier N-dimensional pattern data in units of patterns, synthesizing the readout registration Fourier N-dimensional pattern data with the collation Fourier N-dimensional pattern data, performing either N-dimensional discrete Fourier transform or N-dimensional discrete inverse Fourier transform for the resultant synthesized Fourier N-dimensional pattern data after performing amplitude suppression processing therefor, and performing collation between the registration pattern and the collation pattern on the basis of intensities of correlation components of the respective data constituting N-dimensional pattern data of a correlation component area appearing in the synthesized Fourier transformed N-dimensional pattern data.

3. A pattern collation apparatus comprising:

registration Fourier pattern generating means for generating registration Fourier N-dimensional pattern data by performing N-dimensional discrete Fourier transform for N-dimensional pattern data of a registration pattern; and pattern collation means for setting N-dimensional pattern data of a collation pattern and a plurality of N-dimensional pattern data obtained by rotating the N-dimensional pattern data of the collation pattern through predetermined different angles, generating collation Fourier N-dimensional pattern data by performing N-dimensional discrete Fourier transform for the N-dimensional pattern data of the collation pattern in units of patterns, synthesizing the collation Fourier N-dimensional pattern data with the registration Fourier N-dimensional pattern data, performing either N-dimensional discrete Fourier transform or N-dimensional discrete inverse Fourier transform for the resultant synthesized Fourier N-dimensional pattern data after performing amplitude suppression processing therefor, and performing collation between the registration pattern and the collation pattern on the basis of intensities of correlation components of the respective data constituting N-dimensional pattern data of a correlation component area appearing in the synthesized Fourier transformed N-dimensional pattern data.

4. A pattern collation apparatus comprising:

registration Fourier pattern generating means for generating registration Fourier N-dimensional pattern data by performing N-dimensional discrete Fourier transform for N-dimensional pattern data of a registration pattern;

collation Fourier pattern data generating means for generating collation Fourier N-dimensional pattern data by performing N-dimensional discrete Fourier transform for N-dimensional pattern data of a collation pattern; and pattern collation means for setting the collation Fourier N-dimensional pattern data and a plurality of collation Fourier N-dimensional pattern data obtained by rotating the collation Fourier N-dimensional pattern data through predetermined different angles, synthesizing the collation Fourier N-dimensional pattern data with the registration Fourier N-dimensional pattern data in units of patterns, and performing either N-dimensional discrete Fourier transform or N-dimensional discrete inverse Fourier transform for the resultant synthesized Fourier N-dimensional pattern data after performing amplitude suppression processing therefor, and performing collation between the registration pattern and the collation pattern on the basis of intensities of correlation components of the respective data constituting N-dimensional pattern data of a correlation component area appearing in the synthesized Fourier transformed N-dimensional pattern data.

5. A pattern collation apparatus comprising:

registration Fourier pattern data generating means for generating registration Fourier N-dimensional pattern data by performing amplitude suppression processing for N-dimensional pattern data of a registration pattern and a plurality of N-dimensional pattern data obtained by rotating the N-dimensional pattern data through predetermined different angles, after N-dimensional discrete Fourier transform is performed therefor;

collation Fourier pattern data generating means for generating collation Fourier N-dimensional pattern data by performing amplitude suppression processing for N-dimensional pattern data of a collation pattern after N-dimensional discrete Fourier transform is performed therefor; and pattern collation means for reading out the registration Fourier N-dimensional pattern data in units of patterns, synthesizing the readout registration Fourier N-dimensional pattern data with the collation Fourier N-dimensional pattern data, and performing either N-dimensional discrete Fourier transform or N-dimensional discrete inverse Fourier transform for the resultant synthesized Fourier N-dimensional pattern data after performing amplitude suppression processing therefor, and performing collation between the registration pattern and the collation pattern on the basis of intensities of correlation components of the respective data constituting N-dimensional pattern data of a correlation component area appearing in the synthesized Fourier transformed N-dimensional pattern data.

6. A pattern collation apparatus comprising:

registration Fourier pattern data generating means for generating registration Fourier N-dimensional pattern data by performing amplitude suppression processing for N-dimensional pattern data of a registration pattern after N-dimensional discrete Fourier transform is performed therefor, and setting the registration Fourier N-dimensional pattern data and a plurality of registration Fourier N-dimensional pattern data obtained by rotating the registration Fourier N-dimensional pattern data of the registration pattern through predetermined different angles;

collation Fourier pattern data generating means for generating collation Fourier N-dimensional pattern data by performing amplitude suppression processing for N-dimensional pattern data of a collation pattern after N-dimensional discrete Fourier transform is performed therefor; and pattern collation means for reading out the registration Fourier N-dimensional pattern data from the registration Fourier N-dimensional pattern data in units of patterns, synthesizing the readout registration Fourier N-dimensional pattern with the collation Fourier N-dimensional pattern data, and performing either N-dimensional discrete Fourier transform or N-dimensional discrete inverse Fourier transform for the resultant synthesized Fourier N-dimensional pattern data after performing amplitude suppression processing therefor, and performing collation between the registration pattern and the collation pattern on the basis of intensities of correlation components of the respective data constituting N-dimensional pattern data of a correlation component area appearing in the synthesized Fourier transformed N-dimensional pattern data.

7. A pattern collation apparatus comprising:

registration Fourier pattern data generating means for generating registration Fourier N-dimensional pattern data by performing amplitude suppression processing for N-dimensional pattern data of a registration pattern after N-dimensional discrete Fourier transform is performed therefor; and pattern collation means for setting N-dimensional pattern data of a collation pattern and a plurality of N-dimensional pattern data obtained by rotating the N-dimensional pattern data of the collation pattern through predetermined different angles, generating collation Fourier N-dimensional pattern data by performing amplitude suppression processing for the N-dimensional pattern data of the collation pattern after N-dimensional discrete Fourier transform is performed therefor in units of patterns, synthesizing the collation Fourier N-dimensional pattern data with the registration Fourier N-dimensional pattern data, and performing either N-dimensional discrete Fourier transform or N-dimensional discrete inverse Fourier transform for the resultant synthesized Fourier N-dimensional pattern data after performing amplitude suppression processing therefor, and performing collation between the registration pattern and the collation pattern on the basis of intensities of correlation components of the respective data constituting N-dimensional pattern data of a correlation component area appearing in the synthesized Fourier transformed N-dimensional pattern data.

8. A pattern collation apparatus comprising:

registration Fourier pattern data generating means for generating registration Fourier N-dimensional pattern data by performing amplitude suppression processing for N-dimensional pattern data of a registration pattern after performing N-dimensional discrete Fourier transform therefor;

collation Fourier pattern data generating means for generating collation Fourier N-dimensional pattern data by performing amplitude suppression processing for N-dimensional pattern data of a collation pattern after performing N-dimensional discrete Fourier transform therefor; and pattern collation means for setting the collation Fourier N-dimensional pattern data and a plurality of collation Fourier N-dimensional pattern data obtained by rotating the collation Fourier N-dimensional pattern data of the collation pattern through predetermined different angles, synthesizing the collation Fourier N-dimensional data with the registration Fourier N-dimensional pattern data in units of patterns, and performing either N-dimensional discrete Fourier transform or N-dimensional discrete inverse Fourier transform for the resultant synthesized Fourier N-dimensional pattern data after performing amplitude suppression processing therefor, and performing collation between the registration pattern and the collation pattern on the basis of intensities of correlation components of the respective data constituting N-dimensional pattern data of a correlation component area appearing in the synthesized Fourier transformed N-dimensional pattern data.

9. A pattern collation apparatus comprising:

registration Fourier pattern data generating means for generating registration Fourier N-dimensional pattern data by performing N-dimensional discrete Fourier transform for N-dimensional pattern data of a registration pattern;

collation Fourier pattern data generating means for generating collation Fourier N-dimensional pattern data by performing N-dimensional discrete Fourier transform for N-dimensional pattern data of a collation pattern;

first amplitude suppression means for performing amplitude suppression processing for the registration Fourier N-dimensional pattern data;

second amplitude suppression means for performing amplitude suppression processing for the collation Fourier N-dimensional pattern data;

first polar coordinate system conversion means for converting a coordinate system of the registration Fourier N-dimensional pattern data having undergone the amplitude suppression processing performed by said first amplitude suppression means into a polar coordinate system;

second polar coordinate system conversion means for converting a coordinate system of the collation Fourier N-dimensional pattern data having undergone the amplitude suppression processing performed by said second amplitude suppression means into a polar coordinate system;

amplitude suppression correlation collation means for collating the registration Fourier N-dimensional pattern data, whose coordinate system is converted into the polar coordinate system by said first polar coordinate system conversion means, with the collation Fourier N-dimensional pattern data, whose coordinate system is converted into the polar coordinate system by said second polar coordinate system conversion means;

rotation offset amount measuring means for obtaining a rotation offset amount between the registration Fourier N-dimensional pattern data and the collation from a position of a correlation peak obtained in the process of collation performed by said amplitude suppression correlation collation means; and rotation offset correction means for performing rotation offset correction with respect to one of the registration pattern and the collation pattern on the basis of the rotation offset amount obtained by said rotation off set amount measuring means, wherein the registration pattern and the collation pattern are collated again by an amplitude suppression correlation method after rotation offset correction is performed by said rotation offset correction means.

10. An apparatus according to claim 9, wherein when a correlation value of the correlation peak obtained in the process of collation performed by said amplitude suppression correlation collation means is larger than a predetermined threshold, collation between the registration pattern and the collation pattern is immediately performed.

11. A pattern collation apparatus comprising:

registration Fourier pattern data generating means for generating registration Fourier N-dimensional pattern data by performing N-dimensional discrete Fourier transform for N-dimensional pattern data of a registration pattern;

collation Fourier pattern data generating means for generating collation Fourier N-dimensional pattern data by performing N-dimensional discrete Fourier transform for N-dimensional pattern data of a collation pattern;

first amplitude suppression means for performing amplitude suppression processing for the registration Fourier N-dimensional pattern data;

second amplitude suppression means for performing amplitude suppression processing for the collation Fourier N-dimensional pattern data;

first polar coordinate system conversion means for adding phase signs to amplitudes of registration Fourier N-dimensional pattern data having undergone amplitude suppression processing performed by said first amplitude suppression means, extracting only amplitude components having the signs, and converting a coordinate system of the resultant data into a polar coordinate system;

second polar coordinate system conversion means for adding phase signs to amplitudes of collation Fourier N-dimensional pattern data having undergone amplitude suppression processing performed by said second amplitude suppression means, extracting only amplitude components having the signs, and converting a coordinate system of the resultant data into a polar coordinate system;

amplitude suppression correlation collation means for collating the registration Fourier N-dimensional pattern data, whose coordinate system is converted into the polar coordinate system by said first polar coordinate system conversion means, with the collation Fourier N-dimensional pattern data, whose coordinate system is converted into the polar coordinate system by said second polar coordinate system conversion means;

rotation offset amount measuring means for obtaining a rotation offset amount between the registration Fourier N-dimensional pattern data and the collation from a position of a correlation peak obtained in the process of collation performed by said amplitude suppression correlation collation means; and rotation offset correction means for performing rotation offset correction with respect to one of the registration pattern and the collation pattern on the basis of the rotation offset amount obtained by said rotation offset amount measuring means, wherein the registration pattern and the collation pattern are collated again by an amplitude suppression correlation method after rotation offset correction is performed by said rotation offset correction means.

12. An apparatus according to claim 11, wherein when a correlation value of the correlation peak obtained in the process of collation performed by said amplitude suppression correlation collation means is larger than a predetermined threshold, collation between the registration pattern and the collation pattern is immediately performed.

13. A pattern collation apparatus comprising:

registration Fourier pattern data generating means for generating registration Fourier N-dimensional pattern data by performing N-dimensional discrete Fourier transform for N-dimensional pattern data of a registration pattern;

collation Fourier pattern data generating means for generating collation Fourier N-dimensional pattern data by performing N-dimensional discrete Fourier transform for N-dimensional pattern data of a collation pattern;

first amplitude suppression means for performing amplitude suppression processing for the registration Fourier N-dimensional pattern data after removing phase components therefrom;

second amplitude suppression means for performing amplitude suppression processing for the collation Fourier N-dimensional pattern data after removing phase components therefrom;

first polar coordinate system conversion means for converting a coordinate system of the registration Fourier N-dimensional pattern data having undergone the amplitude suppression processing performed by said first amplitude suppression means into a polar coordinate system;

second polar coordinate system conversion means for converting a coordinate system of the collation Fourier N-dimensional pattern data having undergone the amplitude suppression processing performed by said second amplitude suppression means into a polar coordinate system;

amplitude suppression correlation collation means for collating the registration Fourier N-dimensional pattern data, whose coordinate system is converted into the polar coordinate system by said first polar coordinate system conversion means, with the collation Fourier N-dimensional pattern data, whose coordinate system is converted into the polar coordinate system by said second polar coordinate system conversion means;

rotation offset amount measuring means for obtaining a rotation offset amount between the registration Fourier N-dimensional pattern data and the collation from a position of a correlation peak obtained in the process of collation performed by said amplitude suppression correlation collation means; and rotation offset correction means for performing rotation offset correction with respect to one of the registration pattern and the collation pattern on the basis of the rotation offset amount obtained by said rotation offset amount measuring means, wherein the registration pattern and the collation pattern are collated again by an amplitude suppression correlation method after rotation offset correction is performed by said rotation offset correction means.

14. An apparatus according to claim 13, wherein when a correlation value of the correlation peak obtained in the process of collation performed by said amplitude suppression correlation collation means is larger than a predetermined threshold, collation between the registration pattern and the collation pattern is immediately performed.

* * * * *